US011711382B2

(12) United States Patent
Williams

(10) Patent No.: US 11,711,382 B2
(45) Date of Patent: Jul. 25, 2023

(54) METHOD AND SYSTEM OF DEDUCING STATE LOGIC DATA WITHIN A DISTRIBUTED NETWORK

(71) Applicant: Clarity Consulting Corporation, Spring, TX (US)

(72) Inventor: Paul Williams, Spring, TX (US)

( * ) Notice: Subject to any disclaimer, the term of this patent is extended or adjusted under 35 U.S.C. 154(b) by 159 days.

(21) Appl. No.: 17/106,060

(22) Filed: Nov. 27, 2020

(65) Prior Publication Data

US 2021/0336975 A1  Oct. 28, 2021

Related U.S. Application Data

(60) Provisional application No. 62/941,576, filed on Nov. 27, 2019.

(51) Int. Cl.
*H04L 9/40* (2022.01)
(52) U.S. Cl.
CPC .............................. *H04L 63/1416* (2013.01)
(58) Field of Classification Search
CPC ............ H04L 63/1416; H04L 63/1408; H04L 63/1425
See application file for complete search history.

(56) References Cited

U.S. PATENT DOCUMENTS

| | | | | |
|---|---|---|---|---|
| 7,225,343 B1* | 5/2007 | Honig | .................... | G06N 7/005 713/193 |
| 9,977,807 B1* | 5/2018 | Bowman | ............... | G06F 16/381 |
| 10,673,880 B1* | 6/2020 | Pratt | .................... | H04L 63/1433 |
| 10,977,222 B1* | 4/2021 | Esman | ............... | G06F 16/2477 |
| 11,336,431 B2* | 5/2022 | Hwang | ................. | H04L 9/0637 |
| 2008/0052606 A1* | 2/2008 | Alstrup | ................. | H04L 65/611 714/784 |
| 2016/0226731 A1* | 8/2016 | Maroulis | ................. | H04L 69/40 |
| 2020/0097585 A1* | 3/2020 | Laskawiec | .......... | G06F 16/2255 |

* cited by examiner

*Primary Examiner* — Daniel B Potratz
*Assistant Examiner* — Matthias Habtegeorgis
(74) *Attorney, Agent, or Firm* — The Juhasz Law Firm

(57) ABSTRACT

A method and system for securing an operating domain that spans one or more distributed information technology networks is disclosed. In the present invention, a state machine reference monitor, comprising a monitor port operatively connected to one or more network traffic capture devices positioned across a distributed network of an operating domain, with each traffic capture interception network device in communication with a central server. Each interception network device along with the central server having a processor and a memory comprising instructions, which when executed by each device processor perform the method of extracting logic state data and deducting ancillary logic state data across the distributed operating domain.

21 Claims, 22 Drawing Sheets

Figure 8B

EXPECTED ACTIONS

| Sequence Number | Time Stamp HH:MM:SS | Max Time Interval (Seconds) | Sending IP Address | Receiving IP Address | Port | Protocol | State Logic (functional intent) |
|---|---|---|---|---|---|---|---|
| 10551 | n/a | n/a | 10.10.1.20 | 10.50.75.56 | n/a | n/a | Open valve 211 |
| 10552 | n/a | 10 | 10.50.75.56 | 10.10.1.20 | n/a | n/a | Valve 211 has been opened |
| 10553 | n/a | 5 | 10.10.1.20 | 10.50.75.180 | n/a | n/a | Send 200K gallons |
| 10554 | n/a | 180 | 10.50.75.180 | 10.10.1.20 | n/a | n/a | 200K gallons sent |
| 10555 | n/a | 5 | 10.50.75.240 | 10.10.1.20 | n/a | n/a | Confirmation: 200K gallons received |
| 10556 | n/a | 3 | 10.10.1.20 | 10.50.75.56 | n/a | n/a | Close valve 211 |
| 10557 | n/a | 10 | 10.50.75.56 | 10.10.1.20 | n/a | n/a | Valve 211 has has been closed |

Processing Primary Logic State Data

PERFORMED ACTIONS

| Sequence Number | Time Stamp HH:MM:SS | Actual Interval (Seconds) | Sending IP Address | Receiving IP Address | Port | Protocol | State Logic (functional intent) |
|---|---|---|---|---|---|---|---|
| 10551 | 14:21:36 | n/a | 10.10.1.20 | 10.50.75.56 | 1723 TCP | VPN | (unintelligible -- encrypted traffic) |
| 10552 | 14:21:42 | 7 | 10.50.75.56 | 10.10.1.20 | 1723 TCP | VPN | (unintelligible -- encrypted traffic) |
| 10553 | 14:21:43 | 1 | 10.10.1.20 | 10.50.75.180 | 1723 TCP | VPN | (unintelligible -- encrypted traffic) |
| 10554 | 14:24:28 | 165 | 10.50.75.180 | 10.10.1.20 | 1723 TCP | VPN | (unintelligible -- encrypted traffic) |
| 10555 | 14:24:29 | 1 | 10.50.75.240 | 10.10.1.20 | 1723 TCP | VPN | (unintelligible -- encrypted traffic) |
| 10556 | 14:24:34 | 1 | 10.10.1.20 | 10.50.75.56 | 1723 TCP | VPN | (unintelligible -- encrypted traffic) |
| 10557 | 14:24:36 | 7 | 10.50.75.56 | 10.10.1.20 | 1723 TCP | VPN | (unintelligible -- encrypted traffic) |

Result: Primary logic processing was not able to decode (understand) the encrypted industrial process control IT network protocol traffic.

Processing Ancillary Logic State Data - Part 1 of 2

PERFORMED ACTIONS (1ST TWO SEQUENCES ONLY ARE DEPICTED)

| Sequence Number | Time Stamp HH:MM:SS | Source IP Address | Destination IP Address | Port | Protocol | Traffic Size (Bytes) | Network Traffic Capture Contents | State Logic Deduction |
|---|---|---|---|---|---|---|---|---|
| 10551 | 14:21:37 | 10.10.1.20 | 10.50.75.56 | 1723 TCP | VPN | 1350 | (unintelligible -- encrypted traffic) | |
| - | 14:21:38 | 10.50.75.56 | 10.0.0.2 | 53 UPD | DNS | n/a | Query for hostname "Valve Actuator 7" | |
| - | 14:21:38 | 10.0.0.2 | 10.50.75.56 | 53 UPD | DNS | n/a | Record lookup returns "10.50.235.45" | |
| - | 14:21:39 | 10.50.75.56 | Broadcast | Broadcast | ARP | 235 | What is the MAC address for 10.50.235.45? | |
| - | 14:21:39 | 10.50.75.56 | 10.50.235.45 | 1723 TCP | VPN | 2275 | (unintelligible -- encrypted traffic) | Command: "Open valve 21" |
| - | 14:21:40 | 10.50.235.45 | 10.50.75.56 | 1723 TCP | VPN | 1550 | (unintelligible -- encrypted traffic) | Report: "Valve 21 is now open" |
| - | 14:21:44 | 10.50.75.56 | 172.16.250.235 | 138 UDP | NetBIOS | 4325 | File sharing - unknown purpose | |
| 10552 | 14:21:45 | 10.50.75.56 | 10.10.1.20 | 1723 TCP | VPN | 2370 | (unintelligible -- encrypted traffic) | Report: "Valve 21 is now open" |

Figure 8C

Processing Ancillary Logic State Data - Part 2 of 2

Ancillary Logic Processing Loop for Sequence numbers 10551 and 10552 above

Network traffic pattern matching logic powers deduction of unrelated ancillary data into State Logic 'Org: TransPipe LLC > Target: Storage Corp > Target IP: 10.20.1.50

Operation "Open Valve 21" has a known ancillary network traffic pattern which has been observed as follows:

Expected Traffic sequence (in listed order = YES):

- SRC: 10.10.1.20 to DST: 10.50.75.56 Port 1723 TCP - VPN traffic 1250-1475 bytes
- SRC: 10.50.75.56 DST: 10.0.0.2 or DST: 10.0.0.3 Port 53 UPD Query for 'Valve Actuator 27'
- SRC: 10.0.0.2 DST: 10.50.75.56 Port 53 UPD Return 10.50.235.45 or 10.50.235.46
- ARP broadcast to resolve 10.50.235.45
- SRC: 10.50.75.56 to DST: 10.50.235.45 Port 1723 TCP - VPN traffic 2100-2475 bytes
- SRC: 10.50.235.45 to DST: 10.50.75.56 Port 1723 TCP - VPN traffic 1400-1650 bytes
- SRC: 10.50.75.56 to DST: 172.16.250.235 Port 138 UDP - NetBIOS file sharing 4200-4500 bytes
- SRC: 10.50.75.56 to DST: 10.10.1.20 Port 1723 TCP - VPN traffic 2100-2475 bytes
- Max Timeframe: 10 seconds (for all traffic above)

End of processing of Sequence numbers 10551 and 10552

Result: if the observed incoming ancillary data matches the "Expected Responses" table and these responses all occur with the listed Max Timeframe limit, which it does in this case, then a state fault alert is not triggere and operations continue.

Figure 8D

METHOD AND SYSTEM OF DEDUCING STATE LOGIC DATA WITHIN A DISTRIBUTED NETWORK

BACKGROUND

This invention relates to cybersecurity for operational domains within and across distributed information technology (IT) networks. Cybersecurity is becoming more important due to increased reliance on the Internet and computer systems in general and cloud computing. Due to the growth of reliance by consumers on "smart" devices, including smartphones, digital televisions, as well as other various smart home appliance devices, the implementation of cybersecurity has become complex. Due to its complexity, both in terms of politics and technology, cybersecurity is one of the major challenges facing the U.S. government and the private sector, as well as foreign governments and international corporations.

Generally, existing cyber security defense products, devices, tools and strategies that have existed from the dawn of the computing age have all used one or more of the following three methods to discover or identify in-progress cyber security failures and breach incidents. These three categories of existing cyber security defenses are:

1. Detection of Aberrant Signatures: By comparing the binary digital code of computer files or network traffic against a regularly updated database containing unique sequences of known-malicious code and computer malware, attacks can be detected.
2. Detection of Aberrant Commands: By matching instructions or commands transmitted over a network against a regularly updated database containing unique sequences of known-malicious instructions or commands, attacks can be detected.
3. Detection of Aberrant Behavior: By looking for and analyzing the actions (behaviors) of software computer programs, computers, servers and/or network equipment, aberrant behavior that is characteristic of an in-progress or known hacker attack or computer malware can be detected.

However, the present invention utilizes a vastly different operating principal type than any other cyber defense detection method in the industry. Through detection of aberrant command-and-control logic states by matching observed logic state changes against expected logic state changes, aberrant behavior of all types can be detected with extremely high levels of assurance, irrespective of the cause, source, or type of the attack. The present innovation is distinguished from U.S. Pat. No. 9,245,147 in two ways: A) network traffic from one or more large scale distributed networks is utilized, verses only a single network, and; B) state logic chains are both derived from application protocols within the captured network streams, as well as indirectly extrapolated by the deductive data analysis and data mining of network traffic that is unrelated to application protocols.

Because this new detection method does not rely on detecting hacker or malware attacks directly by their signatures, instructions, or behavior, but instead only disruptions of expected logic chain sequences, it becomes exceptionally different for hackers to devise even conceptual ways to avoid detection by this innovation.

The present invention provides a unique method of deducing ancillary logic state information by utilizing distributed data collection and data mining techniques across a distributed operational domain spanning one or more IT networks.

DEFINITIONS

Definitions' supporting the description of the patent application is set forth below.

"Distributed Domain" is defined any Information Technology (IT) network or collection of IT networks, and/or any sub-section or set of sub-sections of any IT network or collection of IT networks, and/or any collection of servers and/or computers, and/or any group or collection of software applications whether on a single server or computer or on a collection of separate servers or computers, and/or any collection of network devices of any type or types, and/or any group of databases, and/or any combination of the above, as so defined uniquely by each customer or related group of customers who elect to work together for their common cyber security good of all.

What this means is that to this provisional patent, what is defined as a "Distributed Domain" may change from day to day or even from hour to hour, based on each customer's goals and preferences as they so see fit. Each of our end customers can and will define the boundaries of their respective Distributed Domains as they each uniquely see both prior to the start of initialization (the startup of Constant Guardian® system operations), as well as additionally and optionally during production operations as well.

"Logic states" and "expected logic states" are defined as the expected/permitted/desired collection of actions, non-actions, and the expected/permitted/desired collection of reactions to the actions, non-actions, or erroneous actions of the domain being monitored. See prior art, U.S. Pat. No. 9,245,147 (i.e. "ChainSAW"), which provides a detail description of operational state processing.

Distributed Network Traffic Interception and Distributed Data Mining: a portion of our innovation's data mining algorithms will run on a geographically distributed basis, i.e., on multiple embodiments of our innovation which are connected to switches or network taps physically located at geographical points across the domain, for the purpose of intercepting IT network traffic on a distributed basis to then use distributed data mining to sort through and filtering out massive quantities of unneeded data at the point of each network traffic interception operation. What remains of this filtering out process at each distributed interception point is only a small remnant of the intercepted IT network traffic, which is then tokenized (encoded and compressed using our own proprietary trade secret protected methods) before being forwarded across the IT network to the central primary location of the main embodiment of our innovation, which then conducts the most important portions of our data mining analytics process on the collective aggregated sum total of all the tokenized network data that is being sent to it in real time from distributed points located across a Distributed Domain.

Monitored Domain is a user defined section or sub-section that consists of one or more arbitrary monitored elements. A monitored domain can be defined one or more logic trees represented as one or more finite state machines (FSM) that is configured to emulate events of monitored elements to accomplish customized logically defined rules. The monitored domain can be distributed geographically or logically across multiple local area networks, wide area networks or the internet. The FSMs defined rule set can be dynamically changed in real time operations. The monitored elements can be hardware, software, network traffic, specialized computer controlled or sensor elements. Monitored domain can be composed of both auxiliary data and operational state data.

Monitored elements can be a computer processor, valve, RAM, firmware, software application, network protocol elements, sensors attached to physical object (i.e. noise in the room, light switch, door opening, body heat in the room, body weight on a chair etc). Monitored element can be a logically defined system or subsystem comprising software, hardware, or sensors across a geographically dispersed network. Distributed Domains can be logically segmented by distributed self-contained sub-domains identified by a logical tree or distributed by one or more segmented logical trees. Down-stream processing aggregates, compares, and then deduces transitions between states once the distributed domain is reconstructed. The network traffic interception devices in one embodiment of this innovation may be compromised of a single hardware device installed in each desired network data collection point across the domain, or in a second embodiment may consist of multiple physical hardware devices per each desired network data collection point across the domain, or a third embodiment as a hardware device installed in each desired network data collection point across the domain which replies in part or whole upon third-party security information and event management (SIEM) and/or log management solutions as sources of real-time or near real-time network data, events, incidents, and log files. All these embodiments as may exist work as a collective unit to provide the services ascribed in this document to the network traffic interception devices.

Finite State Machines or logic trees are configured states of a monitored system. The FSM provides the conditions and rules for transitions between states. Auxiliary data is monitored data used to deduce conditions for transitions between states.

This innovation conducts its interception of network traffic by default in real time as the network traffic is actually being exchanged at physical points located across a Distributed Domain. However, our innovation can also optionally work on a configurable delay if so desired by the user by intercepting, storing and sending network traffic data to our central innovation's hardware device on a configurable delay of any length in order to permit belated (after-the-fact) analytical processing, most likely for the purposes of IT network and cyber security debug, troubleshooting and/or investigation purposes.

SUMMARY

In general, this invention relates to a system and method that intercepts various selectable types of network traffic to analyze it using data mining solely for the purpose of identifying, extracting, and obtaining logic state data, which is then compared to a logic state tree of expected/permitted/desired collection of reactions and non-actions to the actions, non-actions, and/or other erroneous actions of the Distributed Domain being monitored. The goal of this invention is to identify aberrations of operations within a Distributed Domain for flagging, real-time alerting, subsequent further investigation and/or corrective action.

Data analytics and data mining is conducted at the central primary location of the main embodiment of our innovation for the sole purpose of capturing or deducing logic state information.

In general, in one aspect, the invention relates to non-transitory computer readable medium comprising instructions, which when executed by a processor performs a method, the method comprising at each of the innovation's network traffic collection devices within an operating domain capturing selectable network communication traffic as applicable for each customer application uniquely; at each network traffic hub filtering relevant network traffic based upon adjustable pattern matching rules; filtering and tokenizing the filtered network traffic; transmitting the tokenized filtered network traffic to the innovation's central network monitoring server; aggregating and standardizing all tokenized filtered network traffic from across the operating domain; and utilizing data analysis and data mining techniques to extract logic states from captured network traffic and/or deduce logic states from ancillary data contained in the captured network traffic.

In general, in another aspect, the invention relates to a state machine reference monitor, comprising a monitor port operatively connected to each of one or more of a number of network traffic capture devices positioned across a distributed network of an operating domain, with each the innovation's traffic capture interception network devices in communication with a central server. Each interception network device along with the central server having a processor, a memory comprising instructions, which when executed by each device processor perform the method as described above. Other aspects of the invention will be apparent from the following description and the appended claims.

BRIEF DESCRIPTION OF DRAWINGS

FIG. 8B illustrate processing of primary logic state data.

FIGS. 8C and 8 fiD illustrate processing of ancillary state data.

Figure 9:
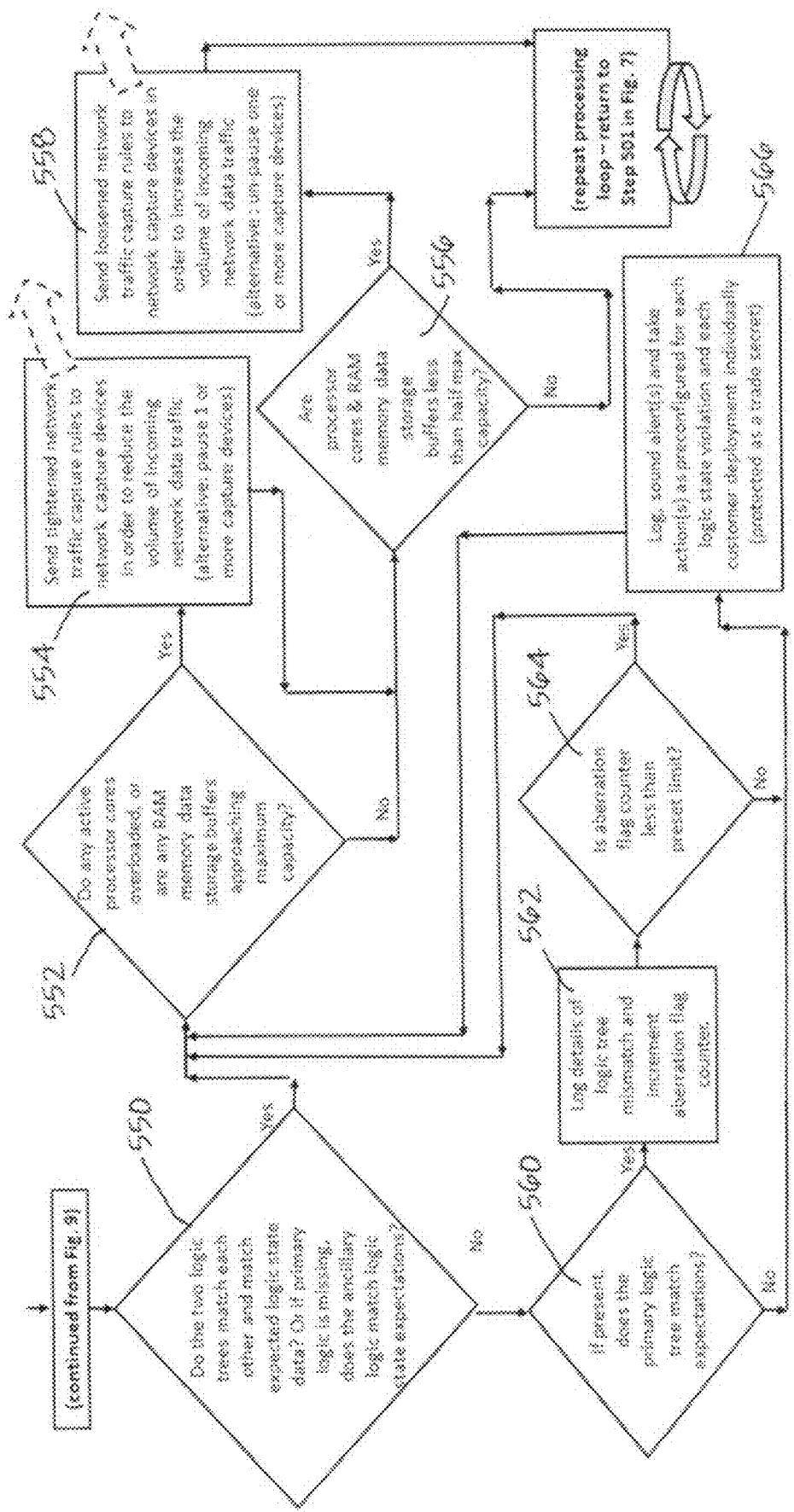

FIG. 9 illustrates the second part of the main processing loop for the CCC Server.

FIG. 10 illustrates the sample retrieved timestamp data.

Figure 10A:
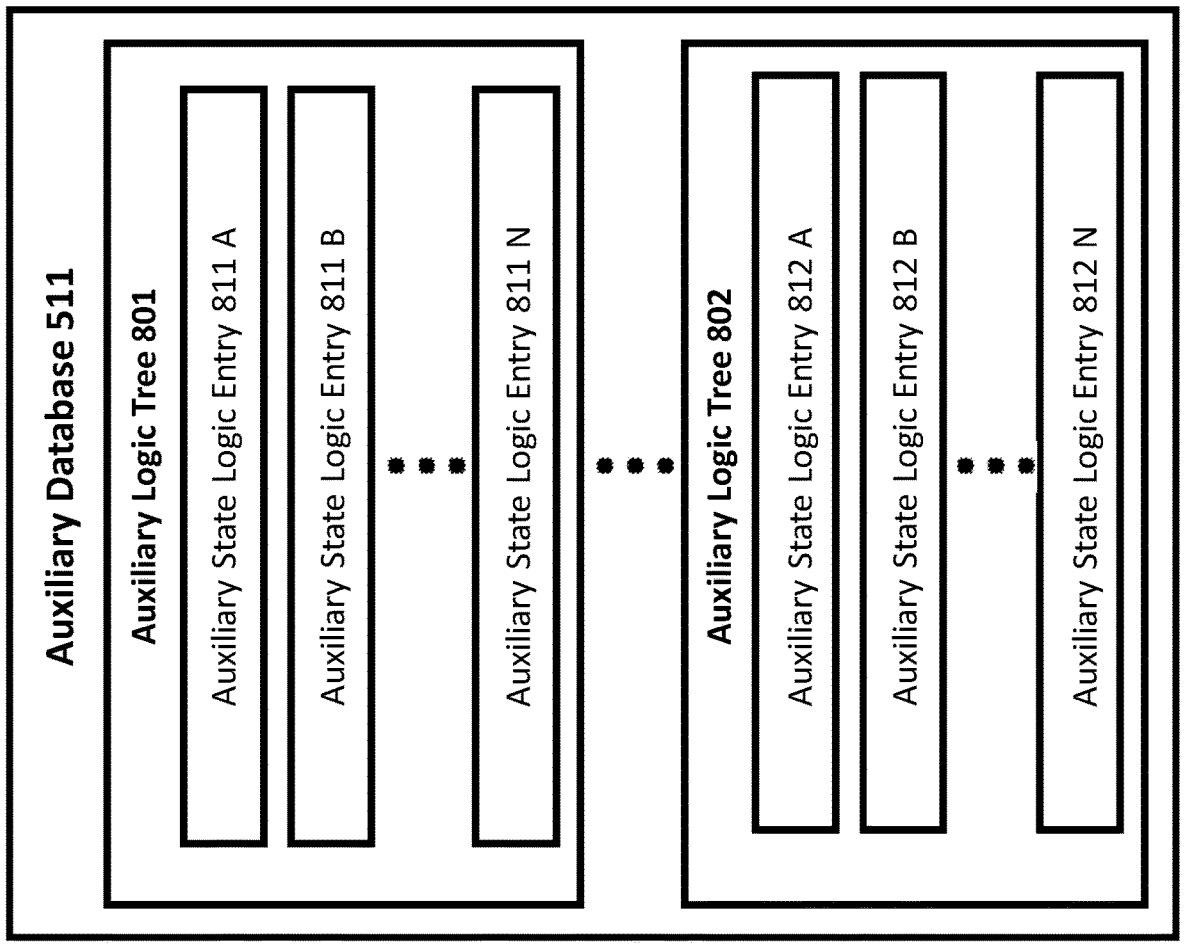

FIG. 10A depicts a sample operational state logic database.

Figure 10B:
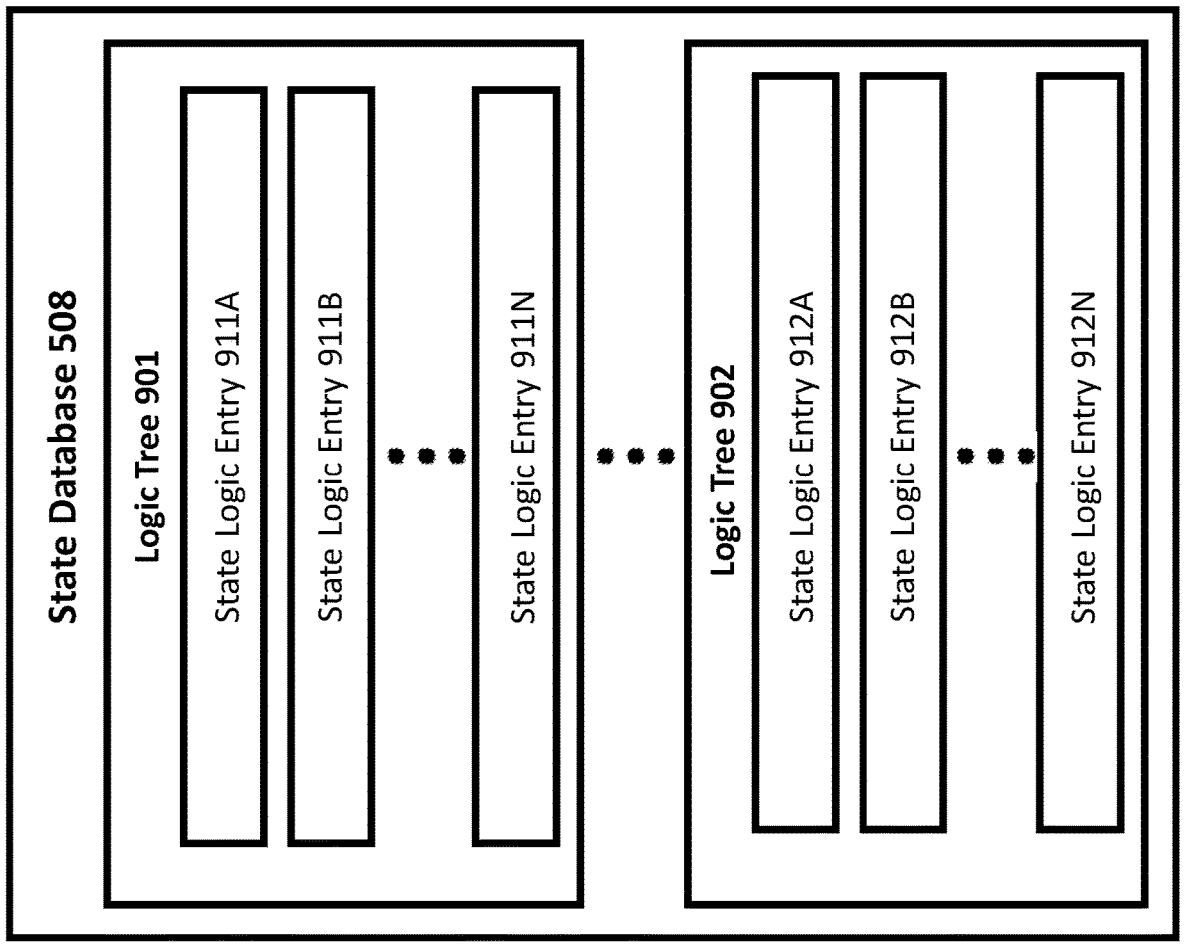

FIG. 10B depicts a sample auxiliary logic state database.

Figure 10C:
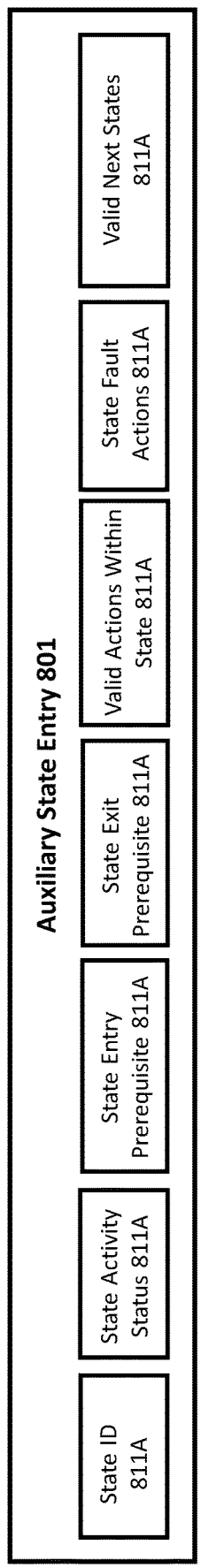

FIG. 10C depicts a sample auxiliary deduced logic state entry.

Figure 10D:
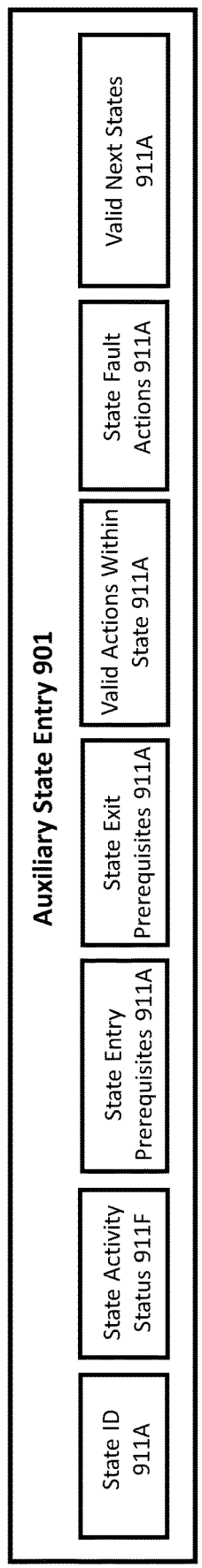

FIG. 10D depicts a sample state entry.

Figure 10E:
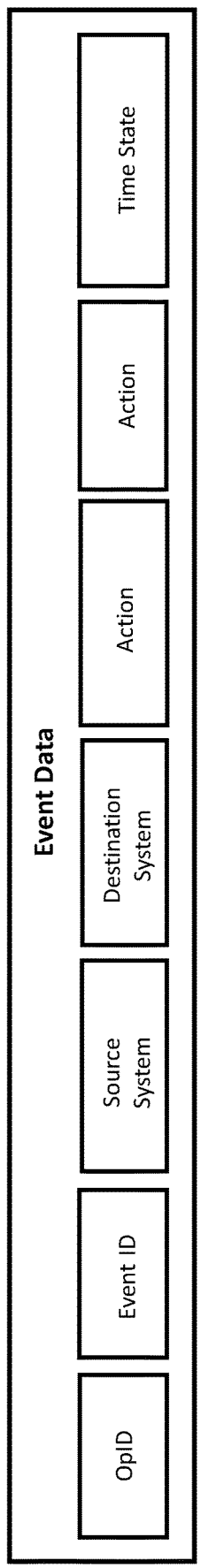

FIG. 10E depicts a sample operationally captured state event data.

Figure 10F:
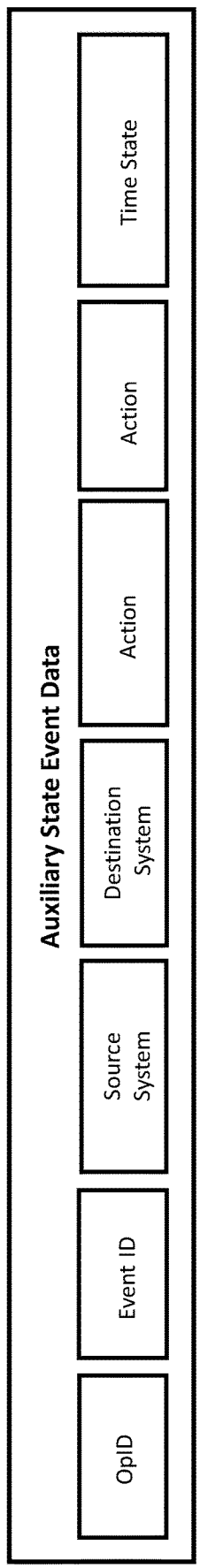

FIG. 10F depicts a sample captured auxiliary event data.

Figure 11A:
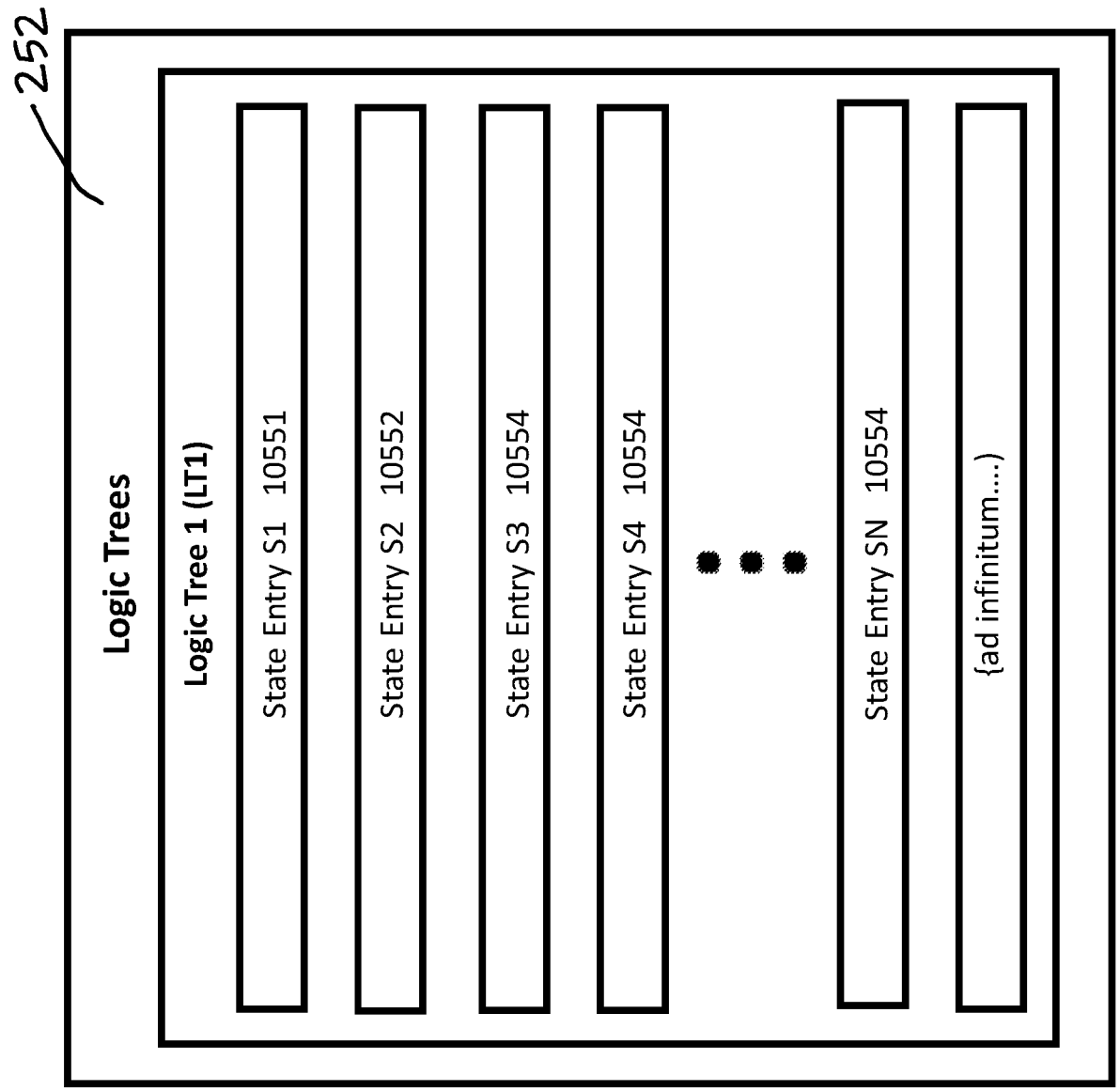

FIG. 11A depicts a sample logic tree.

Figure 11B:
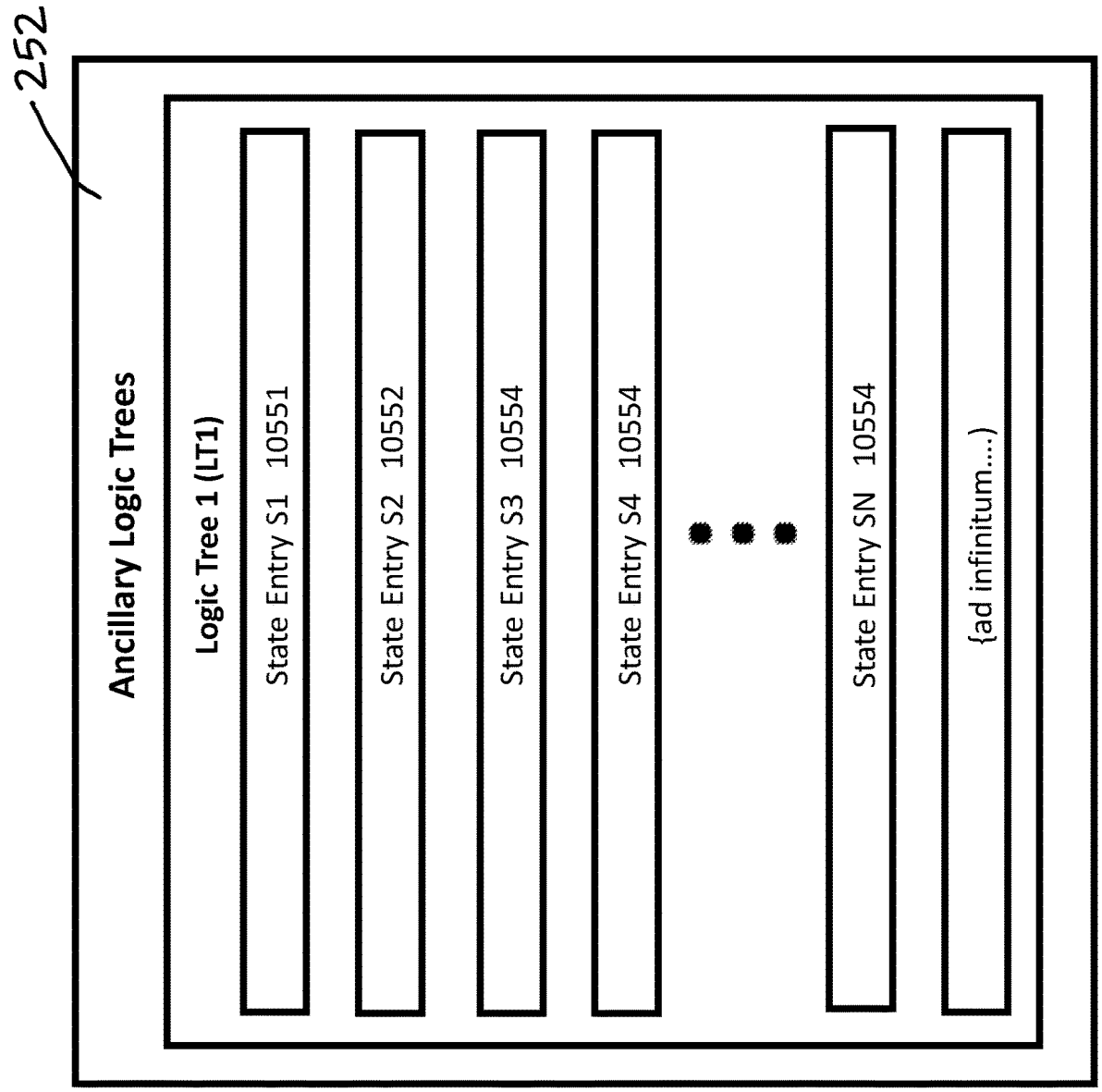

FIG. 11B depicts a sample deduced logic tree.

Figure 12:
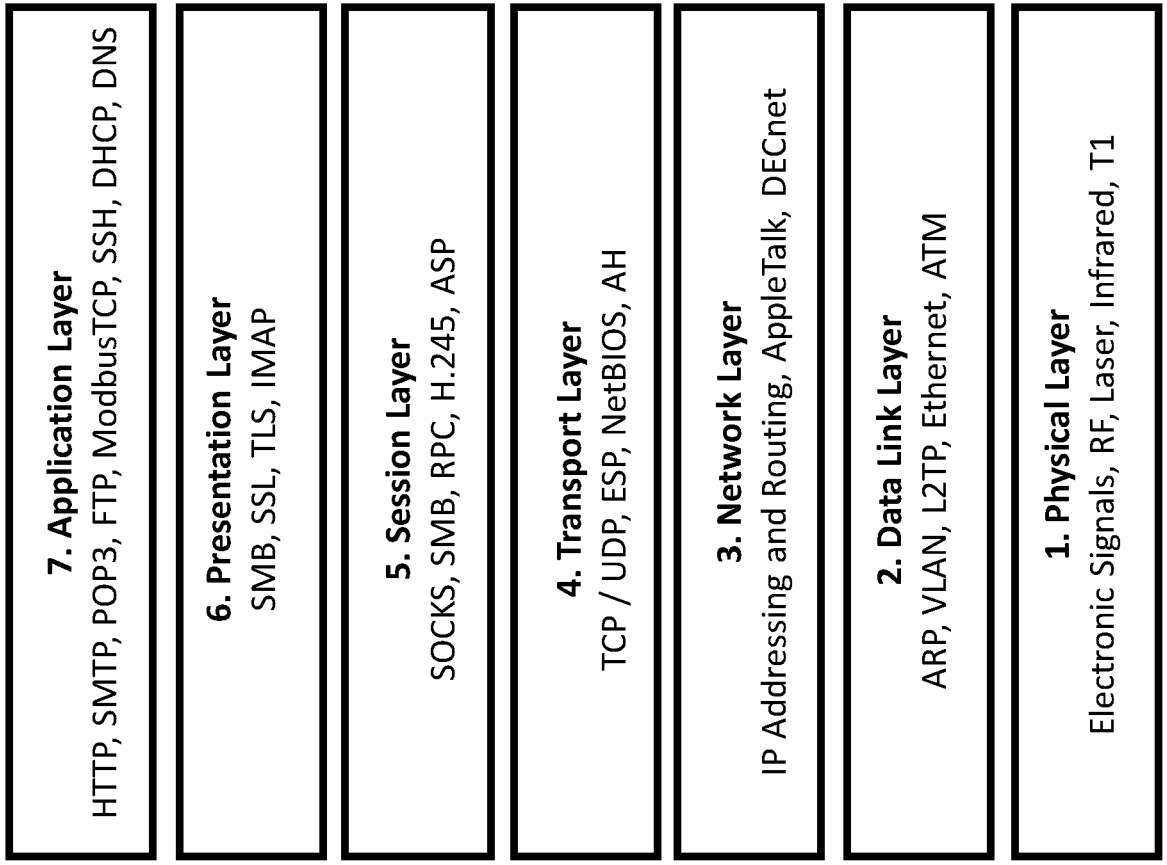

FIG. 12 depicts the OSI Model.

Figure 13:
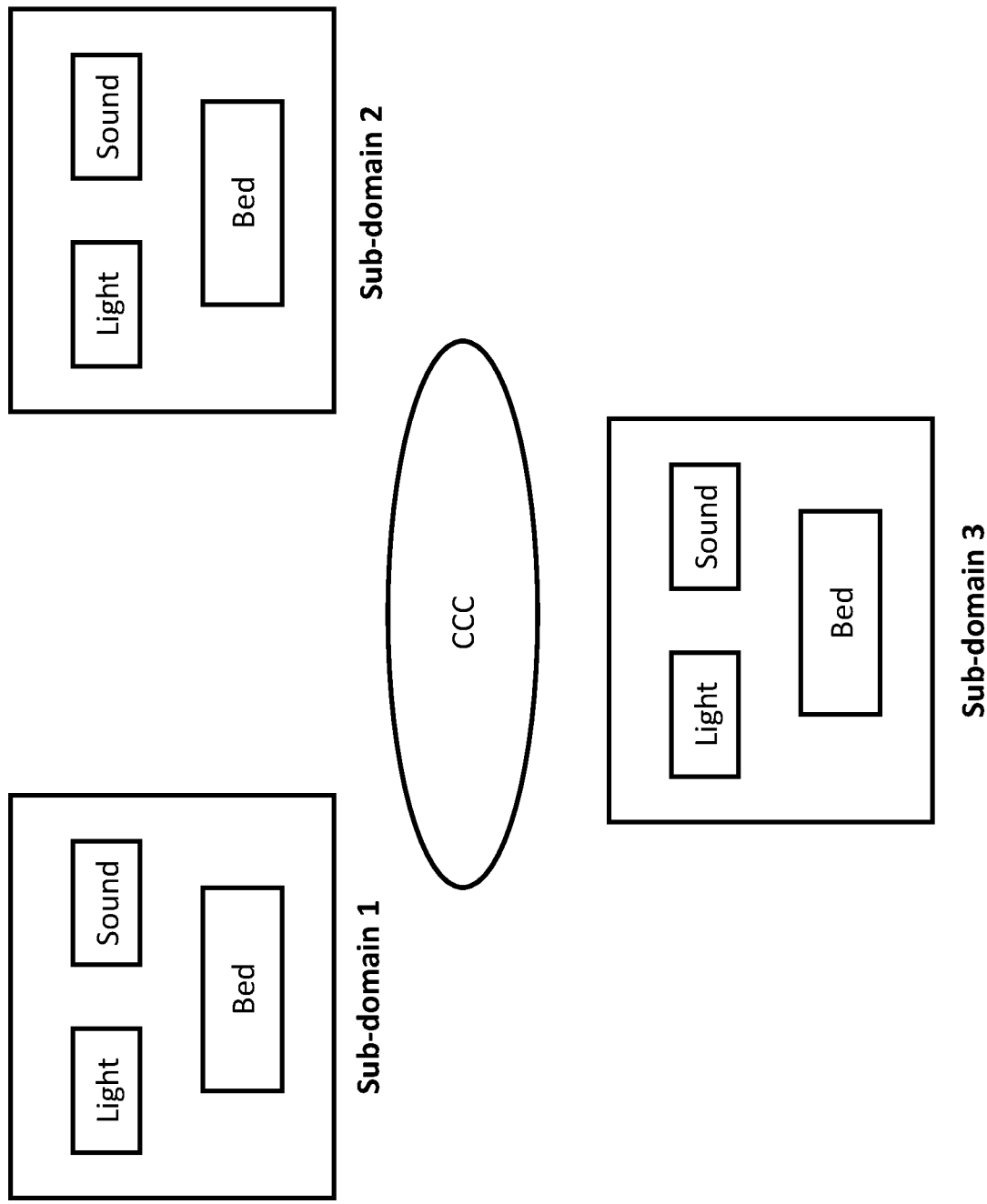

FIG. 13 depicts a representation of a distributed domain.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to those of ordinary skill in the applicable arts that the invention may be practiced without these specific details. In other instances, well-known features have not been described in detail to avoid unnecessarily complicating the description.

OVERVIEW OF THE SYSTEM

In the following description of FIGS. 1-9, in any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components.

Figure 1:
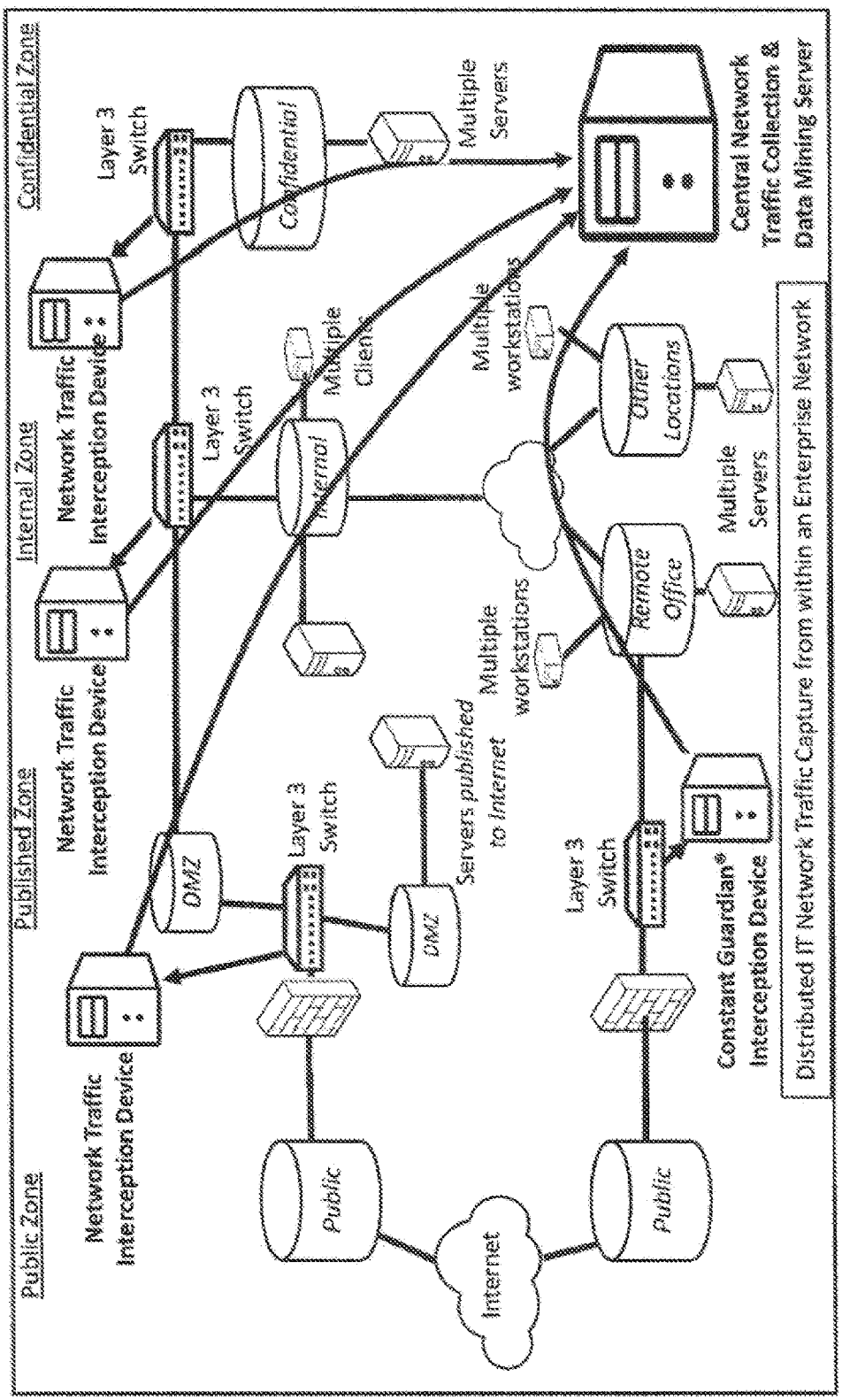
FIG. 1 shows this innovation deployed in accordance with one or more embodiments of the invention.
Figure 2:
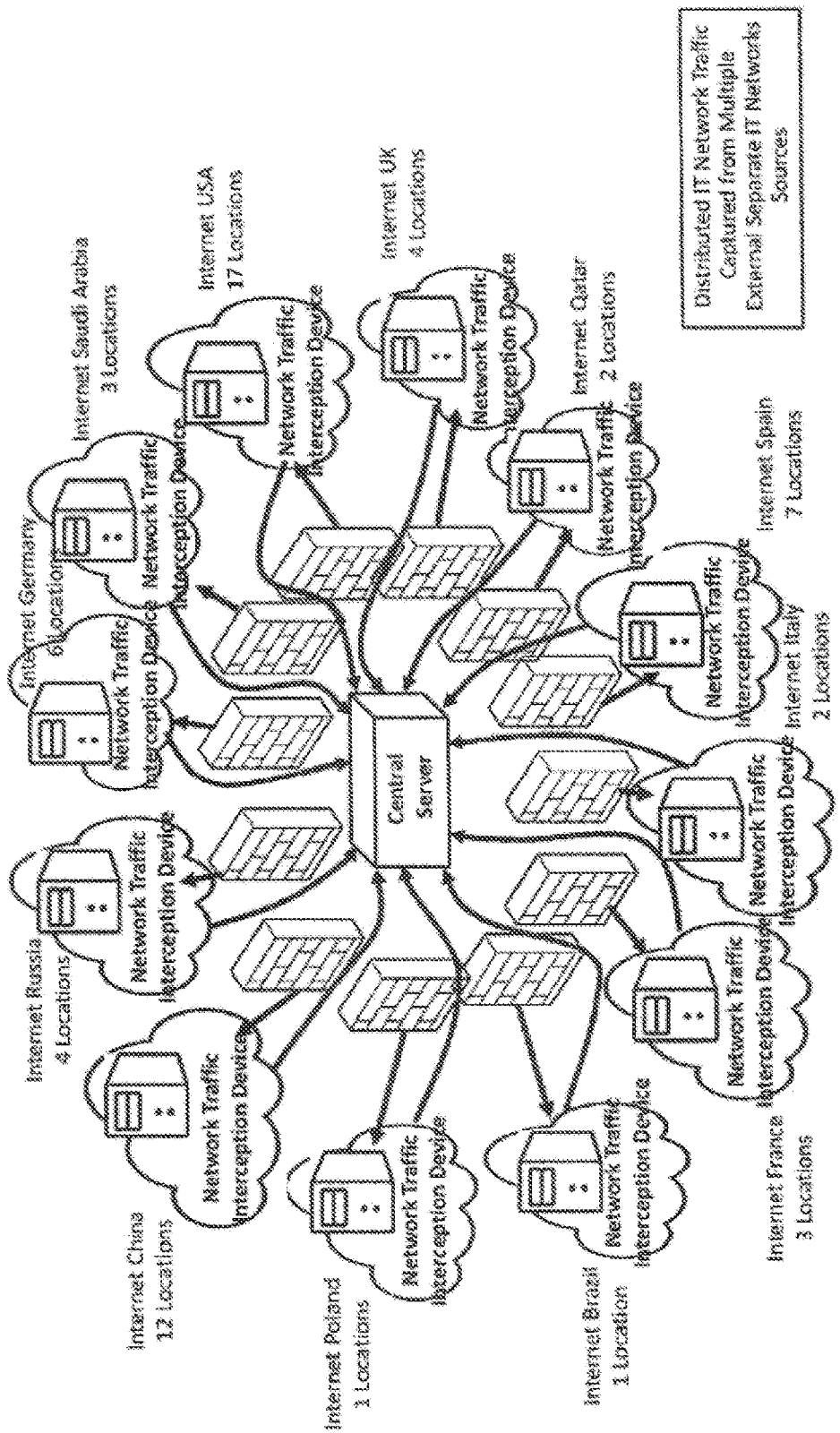
FIG. 2 shows an alternative deployment of this innovation in accordance with one or more embodiments of the invention.

Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. Referring to FIGS. 1 and 2 there is shown a geographically distributed interconnected enterprise IT network that is equipped with this innovation's Interception & Analytics Network Devices (hereinafter "Interception Network Device(s)"). In general, as depicted one Interception Network Device is required per each separate applicable network segment in the Distributed Domain.

Each Interception Network Device is connected to a span port on a switch, software tap or other network tap, and each Interception Network Device is programmed with IT network traffic collection software to receive and filter the resulting incoming network traffic. The present invention provides the ability to dynamically change operational and ancillary network traffic capture and data filtering rules across a Distributed Domain. The foregoing is an improvement over the existing technology because the network traffic filtering rules can be dynamically changed by the innovation as need may so arise.

The purpose of a switch span port or network tap is to send a copy of all network communications passing through that switch to that port. Each of our innovation's Interception Network Devices captures IT network traffic from each span port or other network capture method, and then transmits the captured communications to this innovation's Central Network Traffic Collection & Data Mining Device (hereinafter, "CCC") which is responsible for the further filtering and aggregation and processing of the traffic received from across the entire Distributed Domain.

FIG. 12 illustrates the OSI model. The Open Systems Interconnection model (OSI model) is a conceptual model for standardization of communication functions for network communication traffic without regard for the underlying computing technology. The goal of the OSI model is the interoperability of diverse communication systems with standard communication protocols. The physical layer is responsible for the transmission and reception of unstructured raw data between a device and a physical transmission medium. It converts the digital bits into electrical, radio, or optical signals. The data link layer provides node-to-node data transfer—a link between two directly connected nodes. It detects and possibly corrects errors that may occur in the physical layer. The network layer provides the functional and procedural means of transferring packets from one node to another connected in "different networks". The transport layer provides the functional and procedural means of transferring variable-length data sequences from a source to a destination host, while maintaining the quality of service functions. The session layer controls the dialogues (connections) between computers. It establishes, manages and terminates the connections between the local and remote application. It provides for full-duplex, half-duplex, or simplex operation, and establishes procedures for checkpointing, suspending, restarting, and terminating a session. The presentation layer establishes context between application-layer entities, in which the application-layer entities may use different syntax and semantics if the presentation service provides a mapping between them. If a mapping is available, presentation protocol data units are encapsulated into session protocol data units and passed down the protocol stack. The application layer is the OSI layer closest to the end user, which means both the OSI application layer and the user interact directly with the software application.

The prior art patent, U.S. Pat. No. 9,245,147 ("Chain-SAW"), claims as new and novel the interception, analysis and processing of logic state chain information that is extracted from any and all communication protocols which directly contain logic chain state information over a non-distributed domain. For example, sample protocols include: Modbus over TCP/IP; SQL database traffic; and Microsoft Active Directory replication traffic. The present invention deduces from the analytical data mining processing of any and all communication protocols which do not directly contain logic chain state information. Sample examples include: ARP, DNS, NetBIOS, SQL, Remote Desktop, SMTP, POP3, VPN, SSL/TLS. This system operates on data gathered from across a large-scale Distributed Domain. (a) Application Layer 7: Extraction of logic state chain information gathered from operational communication data from across a large-scale Distributed Domain. (b) Layers 1-6: Deduction of logic state chain information gathered from ancillary communications data from across a large-scale distributed.

A. DISTRIBUTED DATA FILTERING WITH EACH INTERCEPTION NETWORK DEVICE

Figure 3:
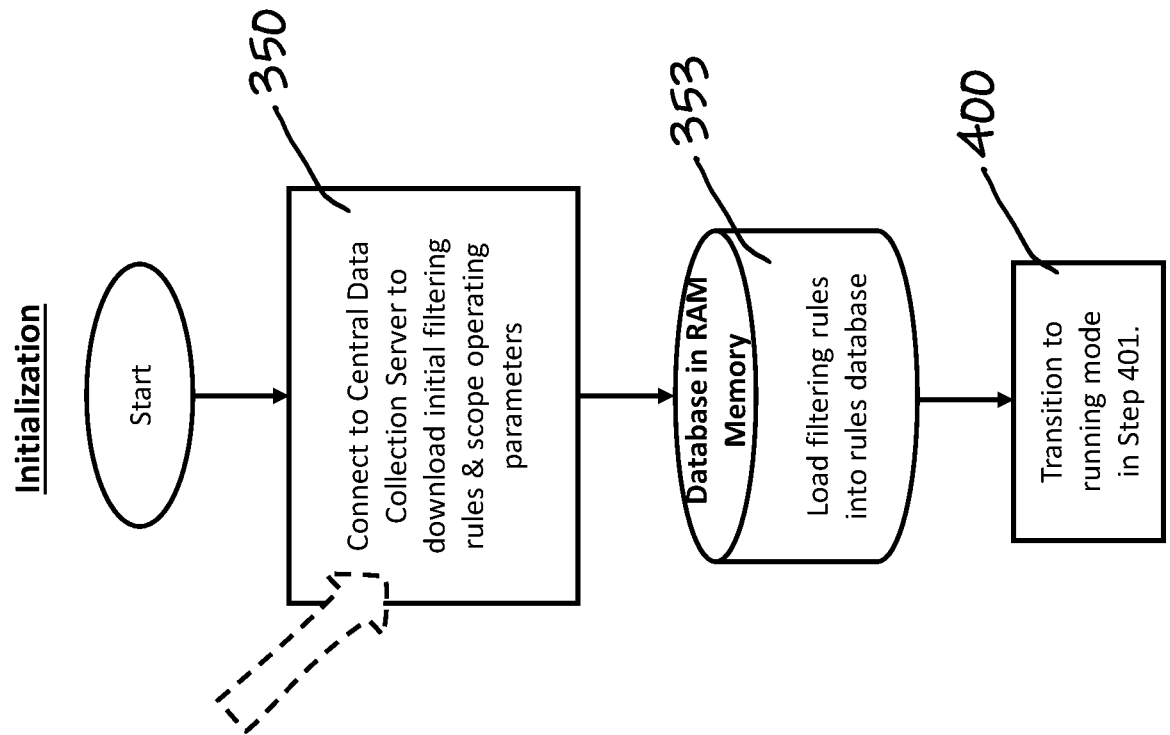
FIG. 3 illustrates a block diagram of the initialization of the IT Network Traffic Device.

Referring to FIG. 3 there is shown the initialization phase of the Interception Network Device. As depicted at step (350), each IT Network Traffic Interception Device connects to the CCC Server to receive customized initial network traffic filtering rules for its specific network segment and assignment within the Distributed Domain. At step (353), the customized filtering rules are stored within the internal storage medium within each interception network device. At step (400) the corresponding interception device enters the main operational phase depicted in FIGS. 4 and 5.

Figure 4:
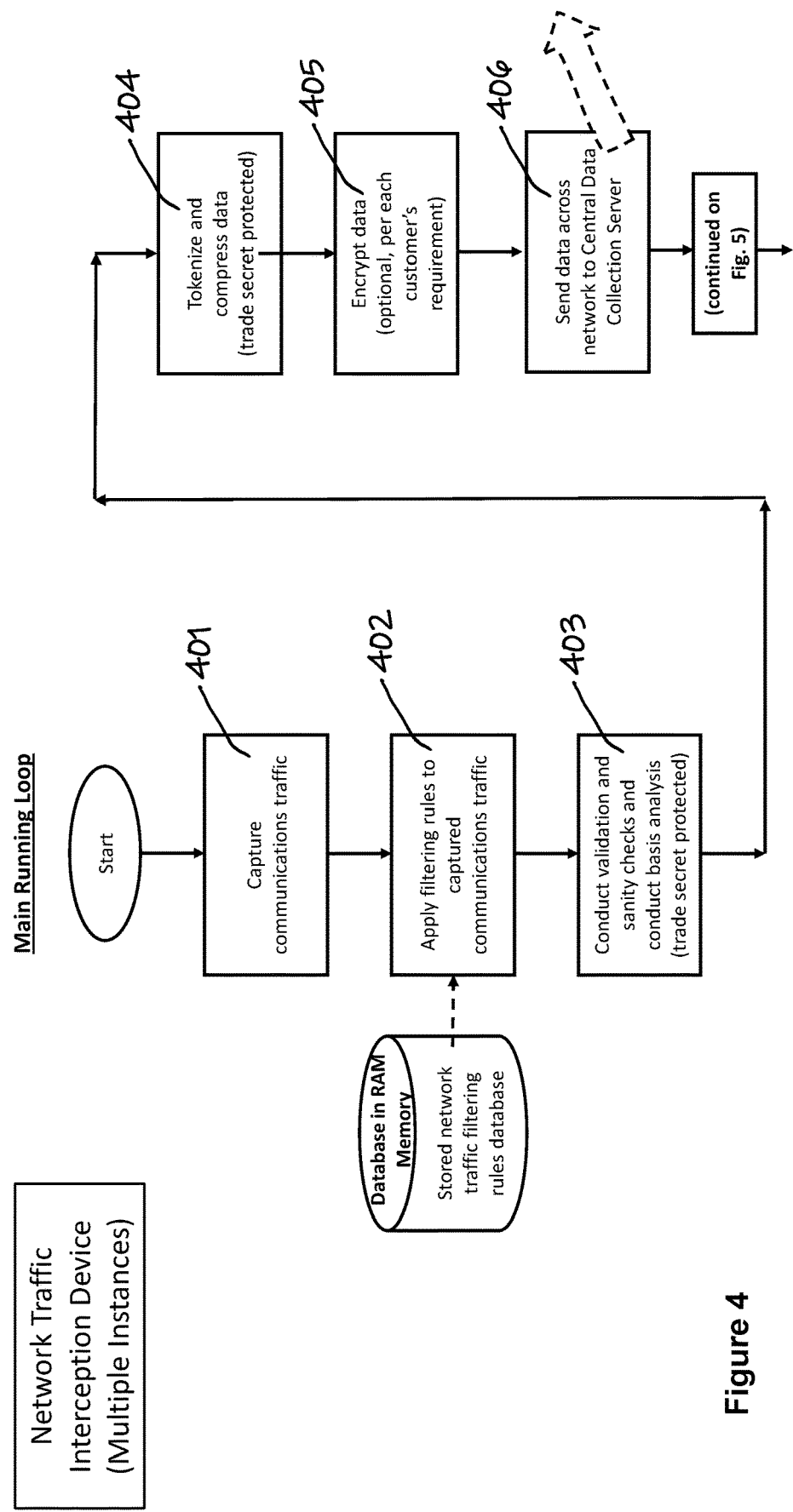
FIGS. 4 and 5 illustrate a flow chart of the processing of the Interception Network Device.

Referring to Step (402) in FIG. 4, each IT Network Traffic Interception Device contains network traffic filtering software equipped with a customizable set of network traffic filtering rules. On each IT Network Traffic Interception Device, these filtering rules determine what types of network traffic are captured by that specific network device and what network traffic types are disregarded. Based upon the customized filtering rules that are in force at each in moment time, the applicable network traffic is captured while the remainder is ignored. In conjunction with the network traffic capture operation at step (401), the network traffic filtering rules at step (402) are applied to either capture only wanted network traffic or alternatively to extract relevant traffic and discard the remainder. As real world examples, the types of communications that one or more Interception Devices target in a Blockchain environment are very substantially different than are the filtering ruleset that will used by a Interception Device deployed in an Industrial Process Control environment.

The type(s) of network traffic that are captured can be based upon both:

1) the overall purpose of each customer's deployment of this system within a Distributed Domain; and 2) the type of communications that is individually targeted by each interception device.

For example, the types of IT network traffic filtering systems required as part of its deployment in a Block-chain environment will vary substantially from the filtering ruleset used in a deployment in an Industrial Process Control environment. However, certain commonalities can apply across all network segments. Specifically, Address Resolution Protocol (ARP) network traffic, Internet Control Messaging Protocol (ICMP), Domain Name System (DNS) network traffic, Virtual Private Networking (VPN) and Remote Desktop network traffic, Microsoft NetBIOS traffic, and Microsoft Active Directory network traffic are always high priority items wherever such traffic types are applicable and present. In some cases, summarized information about these various network traffic types are captured, rather than the actual traffic itself.

B. DISTRIBUTED DYNAMIC DATA ANALYSIS WITH EACH INTERCEPTION NETWORK DEVICE

Figure 5:
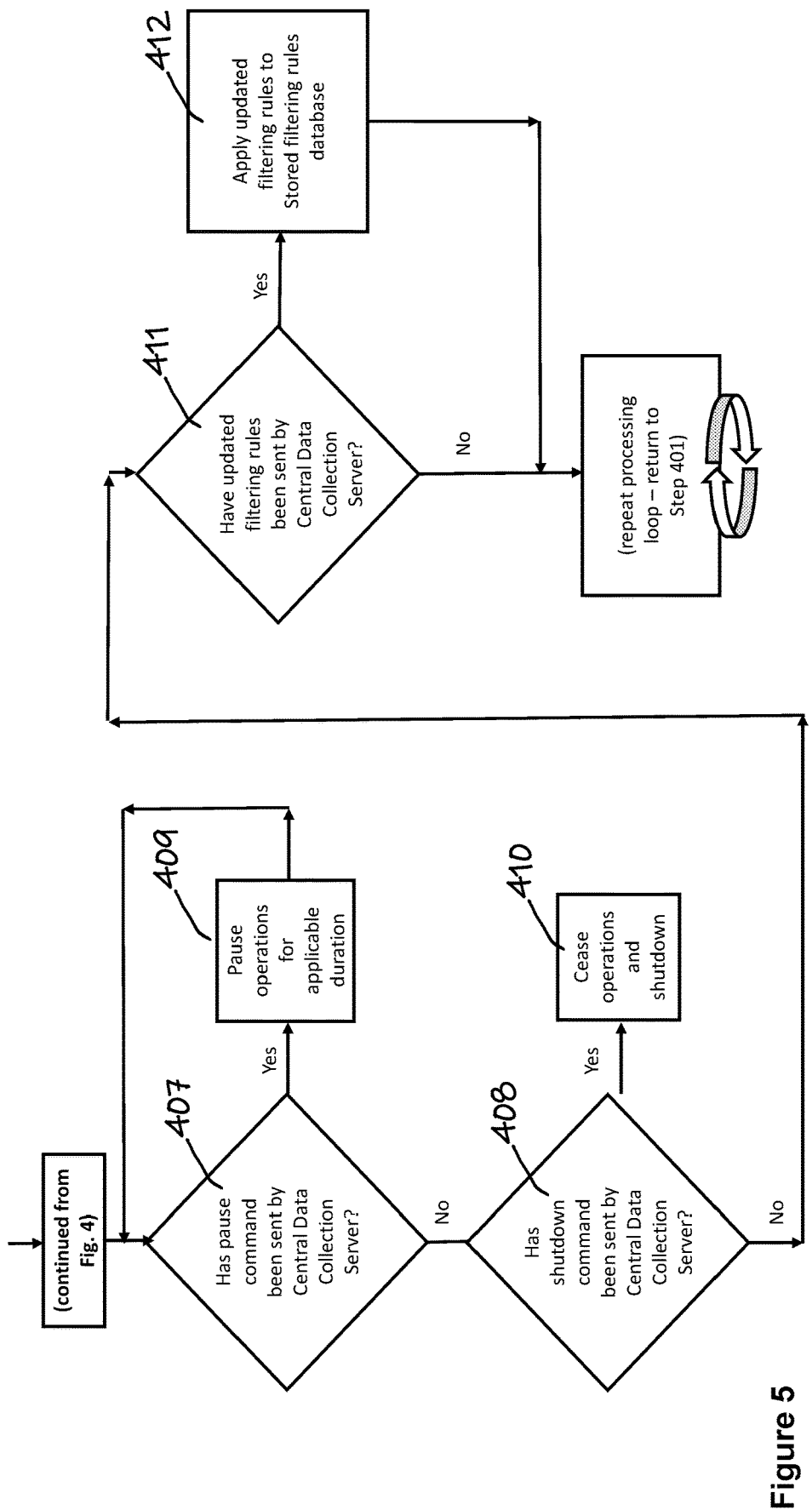

In addition to each IT Network Traffic Interception Device being equipped with customizable network traffic filtering rules as depicted at step (402), the ruleset on any or all of these devices is dynamically adjustable by the Central Management Server as illustrated in steps (407) to (412) in FIG. 5.

Two examples are set forth below:

Example 1: if the Central Management Server becomes overwhelmed with an excessive amount of incoming network traffic, the CCC Server may direct one or more of its distributed IT Network Traffic Interception Device to ignore (disregard) one or more types of network traffic that these Device(s) normally or periodically collect.

Example 2: if the Central Management Server's detects an in-progress anomaly in a network segment in the domain, the Central Management Server may direct the IT Network Traffic Interception Device(s) in one or more network segments in the domain, or even all network segments within the domain, to adjust their network traffic filtering rules to force the collection of additional type(s) of network traffic for analysis by the central Management Server that would otherwise not normally be collected or analyzed.

As depicted in FIG. 1, if the forwarding of traffic is done within a single internal distributed network, such as for example within the enterprise IT networks that are typically owned and operated by U.S. corporations, then each IT Network Traffic Interception Device simply forwards its tokenized network traffic to the CCC Server. In such environments, this task typically requires no special effort or routing to accomplish.

As depicted in FIG. 2, if the forwarding is done between separate distributed networks that are not directly connected to each other except through the Internet, such as between separate enterprise IT networks that are typically owned and operated by separate U.S. corporations, each IT Network Traffic Interception Device forwards its collected network traffic to the central Management Server using Virtual Private Networking (VPN) or other point-to-point network traffic routing technology. In such environments, this task typically requires specific effect and routing to accomplish based upon each applicable networked environment.

Referring to FIGS. 1 and 2 above, these are illustrations of two ways the present invention can be deployed and implemented. The setup and configuration as depicted in FIGS. 1 and 2 will normally be done primarily by each end customer(s)'s IT deployment teams. Through either or both of the aforementioned examples methods outlined above, as may be applicable for each customer environment uniquely and each IT Network Traffic Interception Device uniquely, the Devices send their collected, filtered, analyzed, tokenized, compressed and potentially encrypted data streams in real time to the CCC Central Server.

At step (403), after each IT Network Traffic Interception Device applies its filters to the incoming data stream to whittle the remaining network traffic volume to a small fraction of the total available stream, each Interception Devices then conducts a certain basic network traffic analysis checks. These checks consistent mainly of various types of high-speed validation and sanity checks.

At step (404), the remaining collected data is tokenized for both data compression and increased security purposes. Lastly at step 405 as a customer-configurable option, the tokenized data may be also encrypted as well to adjustable levels of security. At step (406), each IT Network Traffic Interception Device sends its tokenized data to the CCC Server. At step (407) each IT Network Traffic Interception Device checks to see if the CCC Server has sent a pause command. Additionally, at step (408) each IT Network Traffic Interception Device checks to see if the CCC Server has sent a shutdown command.

The pause command is typically sent by the CCC Server to temporarily reduce the volume of incoming data from one or more network segments. The shutdown command is typically sent by the CCC Server to end the collection of data from one or more network segments, or as part of a system-wide cessation of operations. Based upon the received command in step (407), as applicable at step (409) each affected IT Network Traffic Interception Device pauses for the specified duration. Alternatively, as applicable at step (410) the Interception Network Device shutdowns at the specific current or future time. Additionally, at step (411) during each IT Network Traffic Interception Device's processing cycle, each Device individually checks to see if the CCC Server has sent updated network traffic filtering rules. If so, the updated filtering rules are applied in step (412) on each applicable IT Network Traffic Interception Device to its corresponding stored filtering rules database. The new rules will be utilized during the next processing cycle of the applicable Device, which works in a continuous processing loop

C. COLLECTION OF AGGREGATED DATA

Figure 6:
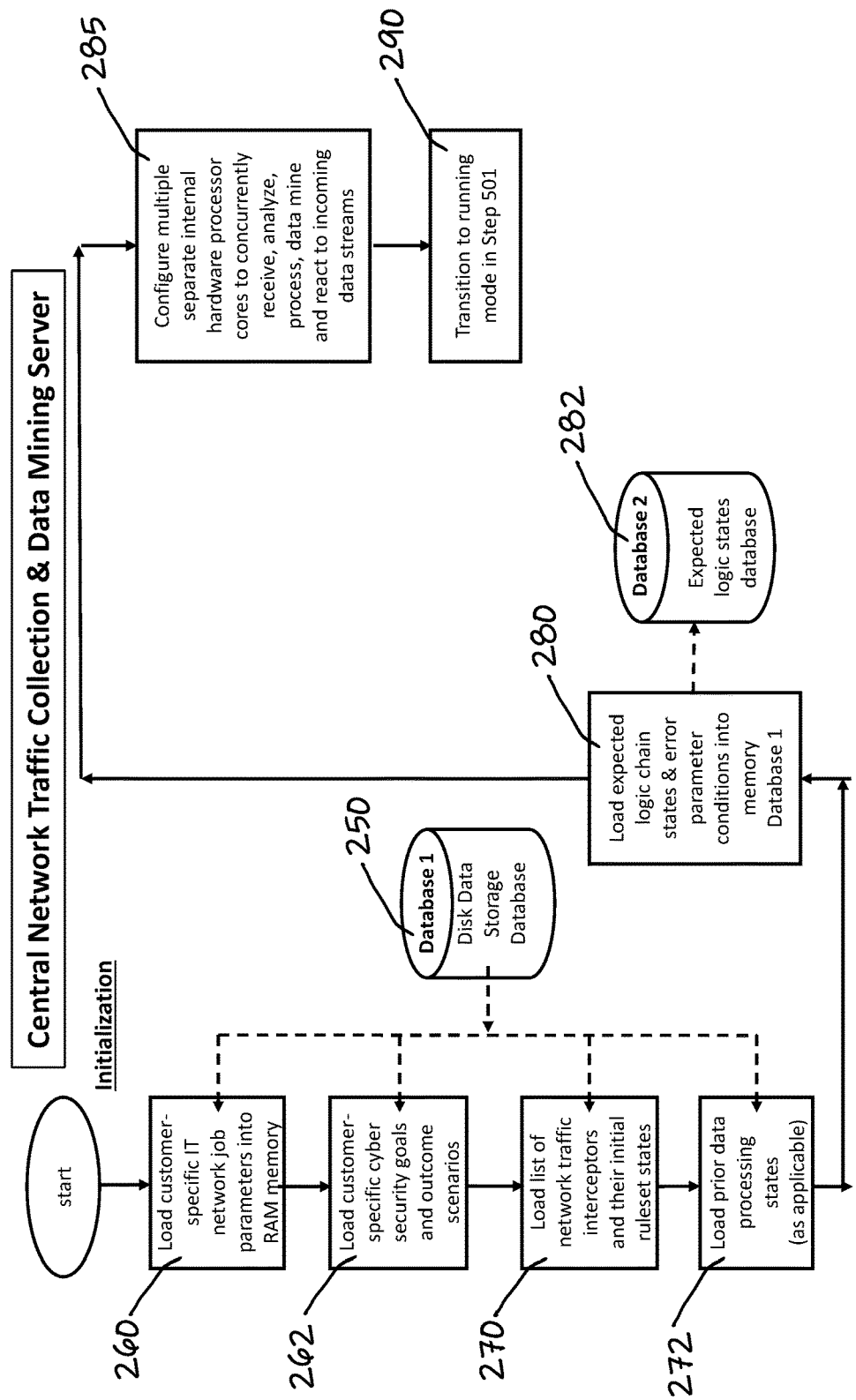
FIG. 6 illustrates a block diagram of the initialization of the Central Network Server Device.

Referring to FIG. 6, the initialization phase of the CCC Server is shown. As depicted in FIG. 6, in steps (260) to (290), the CCC Server sets up the customer specific cyber security goals and outcome parameters and data filtering rules. At step (372), stored prior data processing states are loaded. At step (374), the CCC is configured to process the distributed network traffic across the operating domain. Then the CCC enters the main processing phase depicted in FIGS. 7, 8, 9 and 10.

Figure 7:
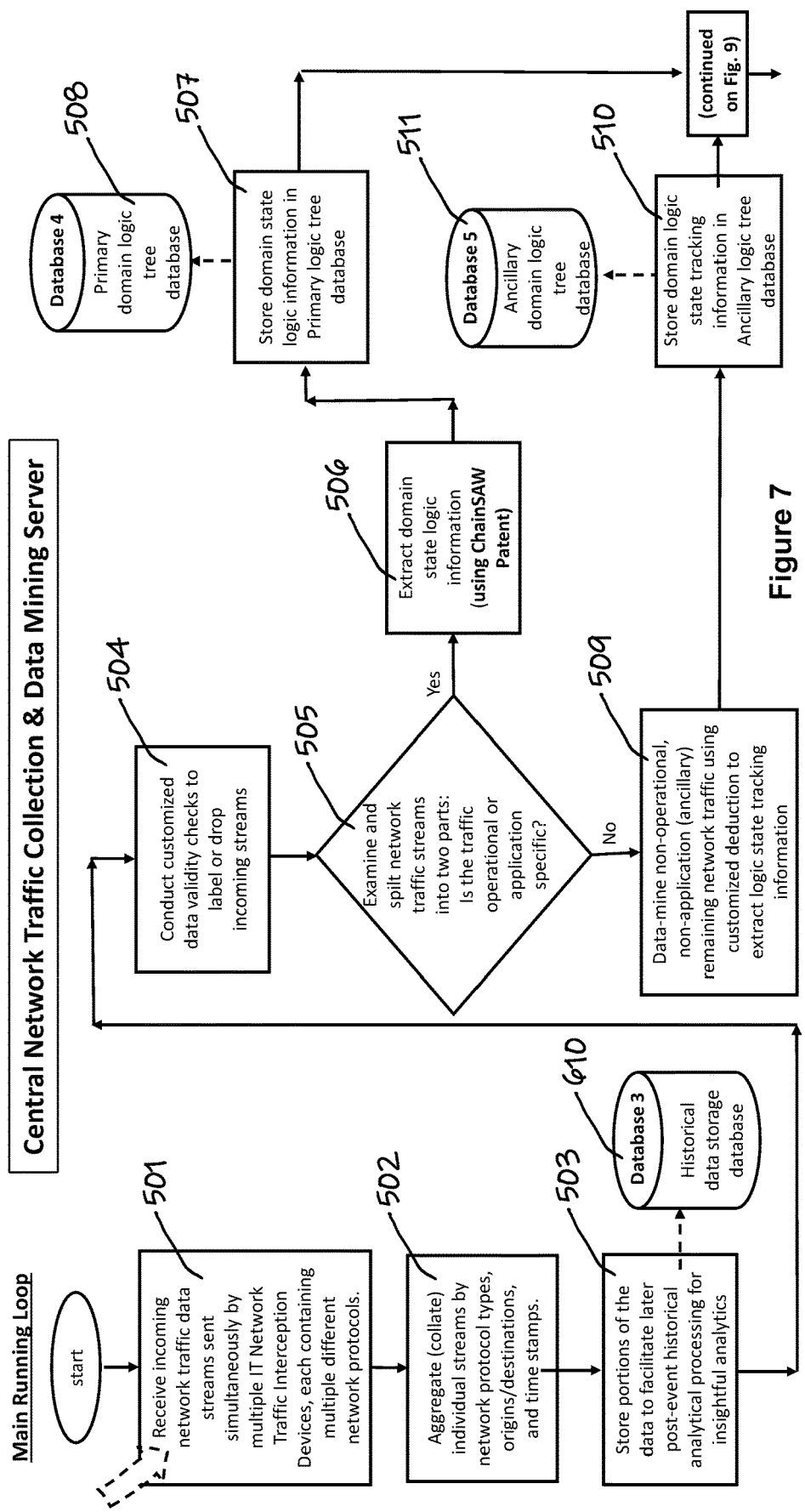
FIG. 7 illustrate a block diagram of the processing structure of the Central Network Server Device.

Referring to FIGS. 7 and 8, there is shown a flow chart of the main processing loop of the CCC Server. In real-time each IT Network Traffic Interception Device forwards their respective collected, filtered, validated, and tokenized data streams to the CCC server. At step (501), various network traffic streams sent by the multiple IT Network Traffic Interception Devices across the Distributed Domain are received by the CCC Server.

The CCC Server in one embodiment may consist of a single hardware device, or in another embodiment the CCC server may consist of multiple physical hardware devices working together effectively as a single unit. The first step in the process is for the CCC Server to receive and aggregate (collate) the multiple incoming traffic streams. At step 501 the CCC receives the horde of multiple streams of network data traffic streams which are being simultaneously sent by Interception Devices across the Distributed Domain.

At step 502 the CCC processes the incoming traffic streams to aggregate (collate) the individual streams together in a common record tracking system organized by network traffic protocol types, origins/destinations, and time stamps, in order to eliminate duplications of data and to normalize the data around common network protocols, time stamps, source origination points and target destinations, and more.

At step 503 certain portions of the remain aggregated data are stored to facilitate future historical analytical processing purposes, such as the production of detailed analytical reports, to facilitate future incident response investigations if so warranted, for regulatory and compliance purposes, and to facilitate our customers' internal continuous self-improvement processes. A historical database labeled as Database 3 is created at step 503.

At step (502), duplicated data within the aggregated collated stream is eliminated and then normalized around common time stamps, source origination points and target destinations, and other data points as may be required for collation of the various data steams into what in practical net effect has become a single data stream.

At step (504), after normalization of the collated data, multiple types of analysis checks on the aggregated network stream are performed, including but not limited to the following:

Protocol validity checks;
Data integrity, validity, accuracy, consistency, and applicability checks;
Aggregate pattern analysis snapshot checks; and
Historical pattern analysis check.

D. EXTRACTING DOMAIN STATE TRACKING INFORMATION

At steps (505) to (506), the aggregated network traffic stream is now processed by the CCC Server to extract operational state logic information from across the Distributed Domain in near real-time with the incoming aggregated network traffic flow.

The CCC Server now examines the incoming network data flow stream to separate it into types of data:

a) Operational Communications Traffic, which directly contain logic state data which is stored in Database 4 at step 507 b) Ancillary Communications Traffic, which does not directly contain logic state data which is stored in Database 5 at step 510.

"Operational Communications Traffic" is defined in this provisional patent filing as being those communications within or across a Distributed Domain which contain instructions, requests and reports that are directly pertaining to the functional operation of the applications, databases, and/or equipment that each customer individually as designated as being the objects of the increased cyber security protection that this technology innovation affords. Such communications by definition always directly contain logic state data. The computer instructions loaded into memory for processing the interception device as well as the CCC are stored non-transitory computer readable medium. The interception device and the CCC Server are computers having processors that are controlled by instructions loaded from computer readable medium.

Example 1—if a customer's purpose for this technology deployment is to enhance the cyber security of a distributed customer sales application which communicates from many endpoint user workstations to various backend databases, then then the term "applicable applications" as used in this patent application refers to the proper operation of this customer's distributed customer sales application.

Example 2—if a customer's purpose for this technology deployment is to enhance the cyber security of a operate a blockchain-based cryptocurrency exchange, then the term "applicable applications" as used in this patent application refers to the proper operation of this customer's blockchain-based cryptocurrency exchange.

"Ancillary Communications Traffic" is defined in this provisional patent filing as being any and all communications within or across a Distributed Domain which do not meet the definition of Operational Communications Traffic, as was defined immediately above. Such communications by definition never directly contain logic state data. Examples of "Ancillary Communications Traffic" as defined by this innovation:

a. Domain Name Service (DNS) traffic.
b. Address Resolution Protocol (ARP) traffic.
c. Proprietary/undocumented/undecipherable network protocols of any kind.
d. Encrypted network traffic of any kind, specifically where our Constant Guardian® innovation does not have an access key and cannot decrypt such data.
e. Network traffic of any kind which is not "Operational Communications Traffic," as defined in Step 505 above.

For example in operational use, if the purpose of distributed domain is to operate a blockchain-based cryptocurrency exchange, then the term "operational state logic information" applies as used in this example applies to the extraction of state logic information from blockchain application related protocols. For this reason, application level protocols in particular are processed to extract domain state logic information for purposes of building a state logic tree.

E. DEDUCING DOMAIN LOGIC STATE TRACKING INFORMATION THROUGH DATA MINING (i) Processing Operational Communications Traffic At step 506 the CCC processes the incoming Operational Communications Traffic for the purpose of extracting state logic information in near-real time from the incoming communications traffic flow. This processing of Operational Communications Traffic (as defined in Step 505 above is conducted concurrently with the processing of Ancillary Communications Traffic (as defined in Step 509) in the next section.

Definition: the term state logic information as used in this provisional patent application is defined at the start of this document.

At step 507 the extracted state logic information is stored in Database 4, a primary domain logic tree database. Database 4 is designated as 508 and stores the state operational logic tree data. Database 4 contains domain logic chain state information.

(ii) Processing Ancillary Communications Traffic

At step 509 concurrently and in parallel at processing step 506 documented above, the incoming Ancillary Communications Traffic stream is separately subjected to intensive processing by the CCC Server. This processing includes the application of sophisticated deductive analytical algorithms, followed by data mining to uncover new patterns and trends. These operations are performed concurrently with processing noted in the prior step.

The purpose of this data mining is to deduce logic state tracking information from the domain.

Definition: the term domain logic state tracking as used in this provisional patent application is defined at the start of this document.

Definition: the term deduce as used this provisional patent filing means "to arrive at a fact or a conclusion by reasoning."

Definition: the term data mining, as used this provisional patent filing, is the analytical processing of large raw data sets against historical data sets to find patterns for the purpose of deducing usable new logic state data and extracting same.

The goal of our deductive analytical and data mining processing is the deductive production of ancillary domain state logic information. The deductive analytical and data mining processing rules are defined based upon each customers defined rule set based upon defined goals.

At step 506 the extracted logic state tracking information is stored in Database 4 ("domain logic tree database). At step 508 Database 4 contains domain logic chain state information (see our separately granted patent, U.S. Pat. No. 9,245,147 "ChainSAW", for a complete definition of logic chain state information). The difference between the contents of this database (Database 5) and the contents of separate Database 4 as listed is the completely different method which was used to acquire what will often be, but critically always, the same information that is stored in both databases.

F. DETECTING STATE LOGIC ABERRATIONS

At this point as depicted in steps (506) and (507), the CCC Server has now processed and produced two separate sets of state logic information. These are the following:

(a) Operational state logic information, as directly extracted from application protocols.

(b) Ancillary state logic information, as indirectly deduced as a result of the data mining analysis in combination with historical data of TCP/IP network communication protocols or other non-application related protocols which do not directly contain state information.

At step (508) and (509), the two separate state logic trees are cross-compared with each other and to historical data, and then in step (509) to the previously stored desired/allowed state logic tree that was loaded during the initialization phase from stored information of desired/allowed domain state logic. The purpose of these compare operations is to identify aberrations in domain state information which can be used in step (513) of the "Action Phase" described below.

Referring to FIG. 9, there is shown the continuation of the main processing loop of the CCC server. At step 550 the primary and ancillary logic tables in Steps 530-B and 530-C (illustrated in FIG. 8A) are compared to the desired/allowed state logic tree in Step 530-A (illustrated in FIG. 8A).

At step 550 a comparison is performed between database 4 and database 5. The comparison in step 550 identifies which of the two incoming datasets (Primary and Ancillary logic) are best suited for use in the action phase as described below. The overriding goal of this Step is to allow the accurate functioning of this system even in instances where all Operational Communications Traffic in Step 506 is encrypted, proprietary, undocumented, inaccessible, corrupted, missing, or are otherwise rendered unusable or unavailable to this system.

At step 550 two separate conditions are evaluated for processing.

a) Primary logic chain does not meet expectations, or;
b) Ancillary logic is available without the presence of Primary logic.

If the two logic trees match at step 550 each other or if the primary logic is missing does the ancillary logic match the expected logic states, then the system proceeds to step 552 else the system proceeds to step 560.

At step 560 a reinforcement feedback loop is created where state logic that has been deduced from the analysis and data mining of ancillary communications traffic is used to identify sophisticated cyber-attacks that an analysis of Primary state logic extracted from Operational Communications Traffic could not detect. If the primary logic tree match expectations, then system proceeds to step 562.

At step 562 the logic tree mismatches are logged and the aberration flag is incremented. At step 564 the aberration flag counter limit is checked. If the aberration flag is less than the present limit then proceed to step 552. Otherwise, the system proceeds to step 566. A simplistic illustrated view is provided because the full details of how we compare and cross-analyze actual and ancillary state tracking data with each other and to historical data and then with the previously stored desired/allowed state logic tree because a full view is complex and depends upon each customers requirements. Unlike the prior art, U.S. Pat. No. 9,245,147 ("ChainSAW"), the understanding of protocol information is NOT required by this provisional patent's innovation for the successful recognition and extraction of logic state information. This innovation provides: (a) improving the IT domain's cyber security; (b) incident response debug; and (c) general purpose IT network troubleshooting and maintenance.

Action Phase

At step 566 the domain state aberrations that have been detected now acted upon in accordance with each unique end customer's previously determined and stored instructions. As examples, each customer can choose from the following list of reactions by the system, for every detected aberrate state uniquely: (a) Sound alarm(s); (b) Send text message(s); (c) Make pre-recorded phone call(s); (d) Send email(s); (e) Log only and continue silently on error; (f) Pause on error; (g) Shutdown some or all domain operations on error; (h) Take pre-determined corrective action to automatically fix the error condition; (i) or any combination of the above; and (j) plus as other reactionary steps as each customer may so individually devise and request.

At step 552 CCC Server, if any of its active processor cores are overloaded, or if any RAM memory data storage buffers approaching maximum capacity then the system proceeds to step 554 else system proceeds to step 556.

At step 554 the CCC sends tightened network traffic capture rules to one or more, or even all, of the Interception Devices across the Distributed Domain in order to reduce the volume of incoming network data traffic. Additionally, the CCC Server has the option of pausing for an adjustable time duration one or more Interception Devices in order to reduce the incoming communication flow or tighten its analytical focus on a problem area in the Distributed Domain, or even to send a Shutdown command to selected Interception Devices.

At step 556 if its processor cores and its RAM memory data storage buffers are underutilized at less than half of capacity the CCC server proceeds to 558 else the CCC server proceeds to step 501 in FIG. 7.

At step 558 the CCC Server sends loosened network traffic capture rules to one or more, or even all, of the Interception Devices across the Distributed Domain in order to increase the volume of incoming network data traffic. Additionally, the CCC Server has the option of un-pausing one or more Interception Devices in order to increase the incoming communication flow or to broaden its analytical coverage of a wider area in the Distributed Domain.

Figure 8A:
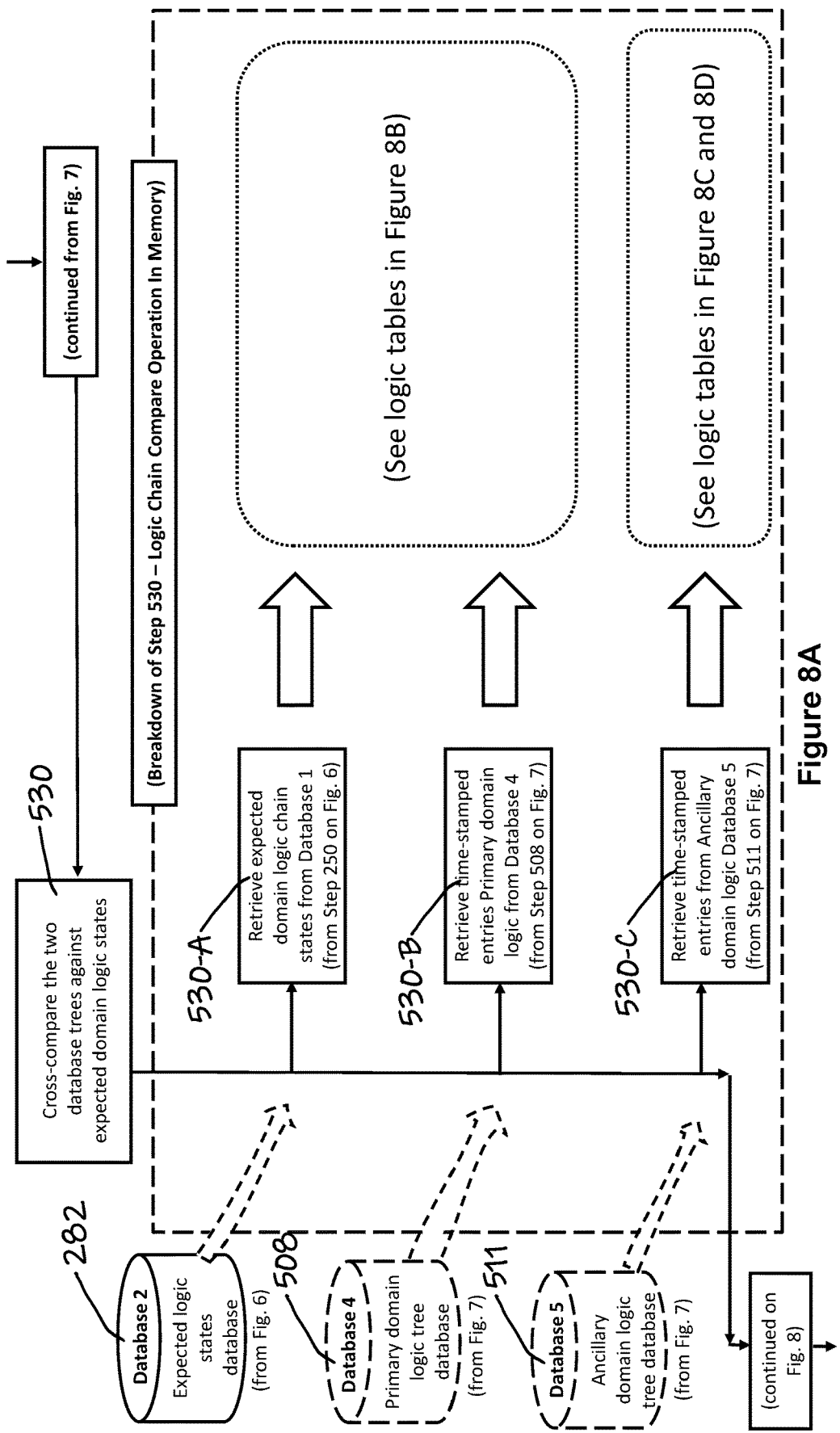
FIG. 8A illustrates the sample database structure used with the CCC Server.

FIG. 8A depicts the cross comparison of the databases at step 530. Database 2 (282) stores the expected states illustrated in FIG. 6. Database 4 (508) stores the primary domain logic tree database in FIG. 7. Database 5 stores the ancillary domain logic tree database (511) depicted in FIG. 7. At Step 530-A the CCC server retrieves expected domain logic chain from Database 1 (250) in FIG. 6. At step 530-B retrieves time-stamped entries from the primary domain logic from Database 4. At step 530-C CCC server retrieves time-stamped entries from Ancillary domain logic stored in Database 5 from step 11 in FIG. 7. FIG. 8B-D illustrates samples of time stamped data that is retrieved in 530-A, 530-B, and 530-C. FIG. 8B illustrates a list of expected actions that is compared against the list of captured state actions. FIG. 8C provides a list of deduced actions from the extracted auxiliary event data. FIG. 8D illustrates deduced list of actions based upon auxiliary event data.

FIGS. 10A and 10B respectively represent database 511 and 508. FIGS. 10C and 10D respectively represent deduced auxiliary state and an operational captured state. FIGS. 10E and 10F respectively represent operational state event and auxiliary event data that is captured by the interception devices. The captured raw auxiliary event data is used to deduce an entry state in the auxiliary database which is compared to the capture logic states as well as the expected logic tree states. FIGS. 8B-8D shows the deduction process. FIGS. 11A and 11B represents respectively the captured logic tree and the deduced logic tree.

H. OPERATIONAL EXAMPLE

Example 1: Prior Art—It's Naptime!

Let's imagine a kind mother named Donna who is in the process of sending her two young children off to bed for a mid-day nap. Speaking in English, Donna issues four instructions to her children.
1. Go straight to bed and go to sleep.
2. Don't play with their toys.
3. Don't talk to each other.
4. Stay in bed for at least an hour before getting up.

Being a wise mother who is well aware of her children's inclination to disobey her nap order, Donna waits a few minutes before going quietly to the bedroom door to listen for any signs that her instructions are possibly not being carried out.

Because Donna initially only understands the English language, she is incapable of understanding any information received through the door except for English language communication. When Donna presses her ear to the door of her children's bedroom, she hears her children speaking not in English, but in the French language.

The aforementioned are illustrative direct logic state rules. Operationally the foregoing example would be implemented with one network device listening for the above listed direct instructions implemented within a logic state tree. FIG. 13 illustrates a sample distributed domain utilizing this example.

Recognizing this foreign human communication for what it is, in reaction Donna has but two choices only:

React solely to the fact that her children are talking when they shouldn't be, even though she does not understand the specifics of what they are saying, and charge them with a violation of her orders on this basis only; or;

Find an electronic device or someone to translate her children's communication in French into the English language, so she can understand what they are saying before reacting accordingly.

While both of these "data processing" methods are valid, the second is preferable by far. Why? For example, if Dona is successfully able to translate her children's speech into English, she may hear them saying as an example that after their nap is over, they will give a surprise gift to their mother, but in the meantime that they had better be quiet and stop talking before Mom hears them and they get into trouble.

The above operational example is implemented within granted U.S. Pat. No. 9,245,147. With the previously granted patented technology the network device would be programmed to only listens for, intercepts, processes, analyzes, and understands the equivalent of spoken human language communication (direct operational instructions only). All other types of sound and sensory input are ignored. below is an illustrative example of the present system and method.

It's Naptime! Take 2

Let's imagine that this time a group of mothers—either separately or working in concert together—are in multiple homes in the process of sending their separate sets of young children off to bed in multiple widely separately bedrooms for their mid-day naps. Speaking in a wide variety of languages, the group of mothers separately or together issues the same four instructions to their separate sets of children:

Go straight to bed and go to sleep.
Don't play with their toys
Don't talk to each other.
Stay in bed for at least an hour before getting up.

The aforementioned states are illustrative direct logic state rules that would be uploaded to each network device across a Distributed Domain, i.e., geographically distributed bedrooms. Being wise mothers who are well aware of their children's inclination to disobey their nap orders, the group of mothers separately wait a few minutes before they all separately go quietly to their respective separate children's bedroom doors to listen for any signs that their instructions are possibly not being carried out.

In addition to the significant improvement that now multiple separate sets of mothers, children, and homes are involved, another huge improvement is that now these mothers are able to use many more ways of monitoring their children than human speech alone.

With the present invention, each network device monitors and processes a wide variety of data inputs. The bedrooms are internationally and geographically distributed with a network device specifically programmed to capture corresponding instructions relative to the geographic location of the bedroom. When the various mothers press their ears to the doors of their various children's various bedroom doors, they separately or together might observe any or all of the following from any or all of the various bedrooms.

FIG. 13 depicts a distributed domain with three monitored sub-domains. Each sub-domain is connected to an interception device which communicates with the controller and/or sensor of the monitored elements which are light, bed, and sound. Each Interception device captures auxiliary and state event data for each monitored element and transmits the captured event data to the CCC Server that creaes the aforementioned primary and auxiliary data bases for each of the monitored sub-domain bedrooms. In the bedrooms some of the following auxiliary data that can be captured are as follows:

(a) The absence of snoring noises, when normally these would be present;

(b) Bright light shining from under the doors, indicating that the bedroom light is on and/or that the formerly shaded windows that have been opened by the children;

(d) Warm air blowing from under the door, further indicating that possibly one or more window have been opened by the children in the room on this hot summer day despite the cool A/C that normally would be present;

(d) The sound of feet walking on carpet.

(e) The rustling of toys being played with;

(f) Slapping noises, including possible rough play by one or more children with a toy or each other;

(g) Weight sensors indicating that no loading exists on a bed that normally would have weight present in such circumstances;

(h) The absence of normally elevated carbon dioxide levels in the room, possibly indicating one or more of the children are absent in the room and/or may have a several medical issue that stopped their breathing;

(i) Electrical power consumption in the children's room that exceeds normal for naptime, indicating the likely use of one or more electrical devices; and (j) Continuous radio wave communications that being transmitted from the room that have never been transmitted before during naptime, indicating the possible use of a cell phone, walkie talkie, or other electronic device. Human speech in English or other human communication languages.

Based upon the foregoing auxiliary data that is captured from each bedrooms

Any or all of the above sensory inputs which are detected to occur in patterns across any two or more bedrooms at once, indicating coordinated action undertaking by two or more sets of children across multiple bedrooms at once ("data mining"). With this present invention, as documented in FIGS. 3-9, the separate sets of sensory inputs captured from each bedroom are then sent to a centralized station which collates the incoming data streams into a single stream. Data analytics and data mining would be conducted for the purpose of generating two separate outputs: actionable information derived from processed human speech (operational logic chains) and actionable information derived from non-speech sensor data (ancillary logic chains extracted from ancillary data streams.

What is claimed is:

1. A computer-implemented method comprising:
   receiving a plurality of data event records wherein each data event record identifies a monitored element within a monitored domain that is connected to one or more computer interception devices;
   extracting from the plurality of data event records an auxiliary subset based upon a first user defined ruleset;
   extracting from the plurality of data event records an operational subset based upon a second user defined ruleset;
   transmitting the auxiliary subset and the operational subset to a central server; and
   at the central server, programming a processor to perform the following steps:
      utilizing data mining techniques deducing an auxiliary operational logic state tree based upon the auxiliary subset;
      generating an operational state logic tree based upon the operational subset;
      comparing the auxiliary operational logic state tree against the operational state logic tree wherein a transition state of the monitored domain is determined;
      determining whether to issue a fault within the monitored domain based upon the transition state; and
      wherein the comparing step at the central server further comprises:
         generating an auxiliary state logic database based upon the auxiliary subset;
         generating an operational state logic database based upon the operational subset;
         comparing the auxiliary state logic database with the operational state logic database to generate a first mismatch logic state;
         comparing the operational state logic database with an expected state logic database to generate a second mismatch logic state;
         comparing the auxiliary state logic database with the expected state logic database to generate a third mismatch logic state; and
         determining a state fault within the operational domain by reconciliation between the first mismatch logic state, the second mismatch logic state and the third mismatch logic state.

2. The method of claim 1 wherein the monitored domain is a distributed domain of interconnected systems spanning multiple geographical locations.

3. The method of claim 2 wherein the distributed domain further comprises one or more interconnected computer networks.

4. The method of claim 3 wherein the one or more interconnected computer networks is selected from the group consisted of open LANs, closed LANs, open WANs, closed WANs or a combination thereof.

5. The method of claim 1 further comprising tokenizing the auxiliary subset.

6. The method of claim 1 further comprising compressing the auxiliary subset.

7. The method of claim 1 further comprising tokenizing the operational subset.

8. The method of claim 1 further comprising compressing the operational subset.

9. The method of claim 1 further comprising in real-time response to a control message from the central server, programming the one or more interception devices to automatically altering the first user defined ruleset.

10. The method of claim 1 further comprising in real-time response to a control message from the central server, programming the one or more interception devices to automatically altering the second user defined ruleset.

11. The method of claim 1 further comprising in real-time response to a control message from the central server, programming the one or more interception devices to automatically increasing or decreasing an amount traffic from the monitored domain.

12. A computer implemented system comprising:
One or more computer interception devices having a hardware processor 1 communicatively coupled with memory 1 and configured to:
 receive a plurality of data event records wherein each data event record identifies a monitored element within a monitored domain that is connected to one or more computer interception devices;
 extract from the plurality of data event records an auxiliary subset based upon a first user defined ruleset;
 extract from the plurality of data event records an operational subset based upon a second user defined ruleset;
 transmit the auxiliary subset and the operational subset to a central server; and
at the central server having one or more a hardware processor 2 communicatively coupled with memory 2 and configure to:
 deduce an auxiliary operational logic state tree based upon the auxiliary subset utilizing data mining techniques;
 generate an operational state logic tree based upon the operational subset;
 compare the auxiliary operational logic state tree against the operational state logic tree wherein a transition state is determined;
 determine whether to issue a fault based upon the transition state; and
 wherein, in comparing the auxiliary operational logic state tree against the operational state logic tree, processor 2 is further configured to:
  generate an auxiliary state logic database in memory 2 based upon the auxiliary subset;
  generate an operational state logic database in memory 2 based upon the operational subset;
  compare the auxiliary state logic database in memory 2 with the operational state logic database in memory 2 to generate a first mismatch logic state;
  compare the operational state logic database with an expected state logic database to generate a second mismatch logic state;
  compare the auxiliary state logic database with the expected state logic database to generate a third mismatch logic state; and
  determine a state fault within the operational domain by reconciliation between the first mismatch logic state, the second mismatch logic state and the third mismatch logic state.

13. The system of claim 12 wherein the monitored domain is a distributed domain of interconnected computerized system.

14. The system of claim 12 wherein the distributed domain further comprises one on more interconnected computer networks across multiple geographical locations.

15. The system of claim 12 further comprising configuring processor 1 to tokenize the auxiliary subset.

16. The system of claim 12 further comprising configuring processor 1 to compress the auxiliary subset.

17. The system of claim 12 further comprising configuring processor 1 to tokenize the operational subset.

18. The system of claim 12 further comprising configuring processor 1 to compress the operational subset.

19. The system of claim 12 further comprising in real-time response to a control message from the central server, programming the one or more interception devices to automatically altering the first user defined ruleset.

20. The system of claim 12 further comprising in real-time response to a control message from the central server, programming processor 1 of the one or more interception devices to automatically altering the second user defined ruleset.

21. The system of claim 12 further comprising in real-time response to a control message from the central server, programming processor 1 of the one or more interception devices to automatically increase or decrease an amount traffic from the monitored domain.

* * * * *